US012731549B2

(12) United States Patent
Park et al.

(10) Patent No.: US 12,731,549 B2
(45) Date of Patent: Sep. 8, 2026

(54) GATE DRIVER AND DISPLAY DEVICE INCLUDING THE SAME

(71) Applicant: SAMSUNG DISPLAY CO., LTD., Yongin-si (KR)

(72) Inventors: Sehyuk Park, Yongin-si (KR); Youngha Sohn, Yongin-si (KR); Jin-Wook Yang, Yongin-si (KR); Donggyu Lee, Yongin-si (KR); Jae-Hyeon Jeon, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/915,563

(22) Filed: Oct. 15, 2024

(65) Prior Publication Data

US 2025/0140206 A1 May 1, 2025

(30) Foreign Application Priority Data

Oct. 26, 2023 (KR) ........................ 10-2023-0145113

(51) Int. Cl.

| | |
|---|---|
| ***G09G 3/3266*** | (2016.01) |
| ***G09G 3/20*** | (2006.01) |
| ***G09G 3/32*** | (2016.01) |

(52) U.S. Cl.

CPC ............. *G09G 3/3266* (2013.01); *G09G 3/20* (2013.01); *G09G 3/32* (2013.01);

(Continued)

(58) Field of Classification Search

CPC ......... G09G 3/3266; G09G 2310/0267; G09G 2310/0286; G09G 2310/08;

(Continued)

(56) References Cited

U.S. PATENT DOCUMENTS

| | | | | |
|---|---|---|---|---|
| 8,515,001 B2 * | 8/2013 | Jang | G11C 19/00 | 377/79 |
| 8,519,764 B2 * | 8/2013 | Iwamoto | G11C 19/287 | 327/212 |

(Continued)

FOREIGN PATENT DOCUMENTS

| | | |
|---|---|---|
| KR | 10-0752652 | 8/2007 |
| KR | 10-2010-0092375 | 8/2010 |

(Continued)

*Primary Examiner* — Gene W Lee

(74) *Attorney, Agent, or Firm* — F. CHAU & ASSOCIATES, LLC

(57) ABSTRACT

A gate driver including: first to N-th stages receiving first to N-th clock signals from first to N-th clock lines, the first stage includes a first clock terminal receiving the first clock signal, a second clock terminal receiving a second clock signal, a carry terminal receiving a vertical start signal, and an output terminal outputting a first gate signal, an N−K-th stage includes a first clock terminal receiving an N−K-th clock signal, a second clock terminal receiving an N−K+1-th clock signal, a carry terminal receiving an N−K−1-th gate signal, and an output terminal outputting an N−K-th gate signal, and the N-th stage includes a first clock terminal receiving the N-th clock signal, a second clock terminal receiving the first clock signal, a carry terminal receiving an N−1-th gate signal, and an output terminal outputting an N-th gate signal.

12 Claims, 17 Drawing Sheets

(52) U.S. Cl.
CPC . *G09G 2310/0267* (2013.01); *G09G 2310/08* (2013.01); *G09G 2330/021* (2013.01)

(58) Field of Classification Search
CPC ........ G09G 2330/021; G11C 19/00–38; G11C 27/04; G06F 5/01
See application file for complete search history.

(56) References Cited

U.S. PATENT DOCUMENTS

| | | | | |
|---|---|---|---|---|
| 8,587,508 | B2 * | 11/2013 | Iwase | G11C 19/28 377/79 |
| 8,755,485 | B2 * | 6/2014 | Jang | G11C 19/28 377/79 |
| 8,953,737 | B2 * | 2/2015 | Jang | G11C 19/28 377/79 |
| 9,001,091 | B2 * | 4/2015 | Sakamoto | G11C 19/28 345/212 |
| 9,159,290 | B2 * | 10/2015 | Huang | G09G 3/3677 |
| 9,368,230 | B2 * | 6/2016 | Yao | G11C 19/28 |
| 9,444,443 | B2 * | 9/2016 | Chung | G11C 19/28 |
| 9,524,797 | B2 * | 12/2016 | Jang | G11C 19/00 |
| 9,791,968 | B2 * | 10/2017 | Hu | G06F 3/0416 |
| 10,276,119 | B2 * | 4/2019 | Sueki | G09G 3/3677 |
| 10,950,324 | B2 * | 3/2021 | Ma | G09G 3/3266 |
| 10,991,783 | B2 * | 4/2021 | Cha | G09G 3/3266 |
| 11,270,649 | B2 * | 3/2022 | Chen | G09G 3/3266 |
| 11,308,888 | B2 * | 4/2022 | Yuan | G09G 3/3677 |
| 11,367,379 | B1 * | 6/2022 | Park | G09G 3/2007 |
| 11,380,265 | B2 * | 7/2022 | Park | G09G 3/3233 |
| 11,538,428 | B2 * | 12/2022 | Chen | G09G 3/3614 |
| 11,929,033 | B2 * | 3/2024 | Kim | G09G 3/3233 |
| 12,014,664 | B2 * | 6/2024 | Zhang | G09G 3/20 |
| 12,100,355 | B2 * | 9/2024 | Keum | G09G 3/3233 |
| 12,154,524 | B2 * | 11/2024 | Chen | G09G 3/3677 |
| 2012/0163528 | A1 * | 6/2012 | Jang | G09G 3/3688 377/64 |
| 2019/0189052 | A1 * | 6/2019 | Moon | G09G 3/3266 |
| 2019/0304377 | A1 * | 10/2019 | Lee | G09G 3/3266 |
| 2021/0027697 | A1 * | 1/2021 | Yoon | G09G 3/3233 |
| 2021/0375226 | A1 * | 12/2021 | Fujihara | G11C 19/28 |
| 2023/0326388 | A1 * | 10/2023 | In | G09G 3/2092 |
| 2024/0212772 | A1 * | 6/2024 | Yan | G09G 3/20 |
| 2025/0166542 | A1 * | 5/2025 | Yan | G09G 3/20 |

FOREIGN PATENT DOCUMENTS

| | | |
|---|---|---|
| KR | 10-2021-0025154 | 3/2021 |
| KR | 10-2022-0129152 | 9/2022 |
| KR | 10-2023-0002266 | 1/2023 |

* cited by examiner

GATE DRIVER AND DISPLAY DEVICE INCLUDING THE SAME

This application claims priority under 35 U.S.C. § 119 to Korean Patent Application No. 10-2023-0145113 filed on Oct. 26, 2023 in the Korean Intellectual Property Office (KIPO), the disclosure of which is incorporated by reference herein in its entirety.

1. TECHNICAL FIELD

Embodiments of the present inventive concept relate to a gate driver and a display device incorporating the gate driver. Specifically, the present inventive concept relates to a gate driver and a display device designed to reduce power consumption.

2. DESCRIPTION OF THE RELATED ART

A display device typically consists of a display panel and a display panel driver. The display panel includes gate lines, data lines, and pixel circuits. The display panel driver includes a gate driver that supplies gate signals to the gate lines, a data driver that provides data voltage to the data lines, and a driving controller that controls the gate driver and the data driver.

The gate driver may receive a clock signal from a clock line. As the load on the clock signal increases, its power consumption may also rise. Consequently, when the power consumption of the clock signal increases, the power consumption of the gate driver may also increase.

SUMMARY

Embodiments of the present inventive concept provide a gate driver with a reduced power consumption.

Embodiments of the present inventive concept provide a display device including the gate driver.

In an embodiment of the present inventive concept, there is provided a gate driver including: first to N-th stages (where Nis a positive integer of 3 or more) for receiving first to N-th clock signals from first to N-th clock lines, wherein the first stage includes a first clock terminal for receiving the first clock signal, a second clock terminal for receiving a second clock signal, a carry terminal for receiving a vertical start signal, and an output terminal for outputting a first gate signal, wherein an N−K-th stage (where K is a positive integer between 1 and N−2) includes a first clock terminal for receiving an N−K-th clock signal, a second clock terminal for receiving an N−K+1-th clock signal, a carry terminal for receiving an N−K−1-th gate signal, and an output terminal for outputting an N−K-th gate signal, and wherein the N-th stage includes a first clock terminal for receiving the N-th clock signal, a second clock terminal for receiving the first clock signal, a carry terminal for receiving an N−1-th gate signal, and an output terminal for outputting an N-th gate signal.

The gate driver includes: the first stage; a second stage including a first clock terminal for receiving the second clock signal, a second clock terminal for receiving a third clock signal, a carry terminal for receiving the first gate signal, and an output terminal for outputting a second clock signal; a third stage including a first clock terminal for receiving the third clock signal, a second clock terminal for receiving a fourth clock signal, a carry terminal for receiving the second gate signal, and an output terminal for outputting a third gate signal; and a fourth stage including a first clock terminal for receiving the fourth clock signal, a second clock terminal for receiving the first clock signal, a carry terminal for receiving the third gate signal, and an output terminal for outputting a fourth gate signal.

When Nis 6, the gate driver includes: the first stage; a second stage including a first clock terminal for receiving the second clock signal, a second clock terminal for receiving a third clock signal, a carry terminal for receiving the first gate signal, and an output terminal for outputting a second clock signal; a third stage including a first clock terminal for receiving the third clock signal, a second clock terminal for receiving a fourth clock signal, a carry terminal for receiving the second gate signal, and an output terminal for outputting a third gate signal; a fourth stage including a first clock terminal for receiving the fourth clock signal, a second clock terminal for receiving a fifth clock signal, a carry terminal for receiving the third gate signal, and an output terminal for outputting a fourth gate signal; a fifth stage including a first clock terminal for receiving the fifth clock signal, a second clock terminal for receiving a sixth clock signal, a carry terminal for receiving the fourth gate signal, and an output terminal for outputting a fifth gate signal; and a sixth stage including a first clock terminal for receiving the sixth clock signal, a second clock terminal for receiving the first clock signal, a carry terminal for receiving the fifth gate signal, and an output terminal for outputting a sixth gate signal.

An activation period of each of the first to N-th clock signals does not overlap with each other.

A length of the activation period of each of the first to N-th clock signals is J horizontal time (where J is a positive number), a length of a deactivation period of each of the first to N-th clock signals is (N−1)×J horizontal time and a period of each of the first to N-th clock signals is N×J horizontal time.

When Nis 4 and J is 1, the length of the activation period of each of the first to N-th clock signals is 1 horizontal time and the length of the deactivation period of each of the first to N-th clock signals is 3 horizontal times, and a period of each of the first to N-th clock signals is 4 horizontal times.

When N increases, the period of each of the first to N-th clock signals increases.

When N increases, a capacitance of an equivalent capacitor viewed from each of the first to N-th clock lines decreases.

The first stage includes: a first transistor including a gate electrode for receiving the first clock signal, a first electrode for receiving the vertical start signal, and a second electrode connected to a first control node; a second transistor including a gate electrode connected to an inverting control node, a first electrode for receiving a high gate voltage, and a second electrode; a third transistor including a gate electrode for receiving the second clock signal, a first electrode connected to the second electrode of the second transistor, and a second electrode connected to the first control node; a fourth transistor including a gate electrode connected to the first control node, a first electrode for receiving the first clock signal, and a second electrode connected to the inverting control node; a fifth transistor including a gate electrode for receiving the first clock signal, a first electrode for receiving a low gate voltage, and a second electrode connected to the inverting control node; a sixth transistor including a gate electrode connected to the inverting control node, a first electrode for receiving the high gate voltage, and a second electrode connected to a gate output node configured to output the first gate signal; a seventh transistor including a gate electrode connected to a second control node, a first electrode for receiving the second clock signal, and a second electrode connected to the gate output node; a first capacitor including a first electrode for receiving the high gate voltage and a second electrode connected to the inverting control node; and a second capacitor including a first electrode connected to the second control node and a second electrode connected to the gate output node.

The first stage further includes an eighth transistor including a gate terminal for receiving the low gate voltage, a first terminal connected to the first control node, and a second electrode connected to the second control node.

In an embodiment of the present inventive concept, there is provided a gate driver including: first to 2N-th stages (where N is a positive integer of 2 or more) for receiving first to 2N-th clock signals from first to 2N-th clock lines, wherein an N−K+1-th stage (where K is a positive integer greater than 1 and less than N) includes a first clock terminal for receiving a 2N−2K+1-th clock signal and a second terminal for receiving a 2N−2K+2-th clock signal, a carry terminal for receiving a vertical start signal, and an output terminal for outputting an N−K+1-th gate signal, and wherein a 2N−K+1-th stage includes a first clock terminal for receiving the 2N−2K+2-th clock signal, a second clock terminal for receiving the 2N−2K+1-th clock signal, a carry terminal for receiving the N−K+1-th gate signal, an output terminal for outputting a 2N−K+1-th gate signal.

When N is 2, the gate driver includes: a first stage including a first clock terminal for receiving the first clock signal, a second clock terminal for receiving a second clock signal, a carry terminal for receiving the vertical start signal, and an output terminal for outputting a first gate signal; a second stage including a first clock terminal for receiving a third clock signal, a second clock terminal for receiving a fourth clock signal, a carry terminal for receiving the vertical start signal, and an output terminal for outputting a second gate signal; a third stage including a first clock terminal for receiving the second clock signal, a second clock terminal for receiving the first clock signal, a carry terminal for receiving the first gate signal, and an output terminal for outputting a third gate signal; and a fourth stage including a first clock terminal for receiving the fourth clock signal, a second clock terminal for receiving the third clock signal, a carry terminal for receiving the second gate signal, and an output terminal for outputting a fourth gate signal.

An activation period of each of the first to 2N-th clock signals does not overlap with each other.

When a length of the activation period of each of the first to 2N-th clock signals is J horizontal time (where J is a positive number), a length of a deactivation period of each of the first to 2N-th clock signals is (2N−1)×J horizontal time and a period of each of the first to 2N-th clock signals is 2N× J horizontal time.

When N increases, the period of each of the first to 2N-th clock signals increases.

When N increases, a capacitance of an equivalent capacitor viewed from each of the first to 2N-th clock lines decreases.

The first stage includes: a first transistor including a gate electrode for receiving the first clock signal, a first electrode for receiving the vertical start signal, and a second electrode connected to a first control node; a second transistor including a gate electrode connected to an inverting control node, a first electrode for receiving a high gate voltage, and a second electrode; a third transistor including a gate electrode for receiving the second clock signal, a first electrode connected to the second electrode of the second transistor, and a second electrode connected to the first control node; a fourth transistor including a gate electrode connected to the first control node, a first electrode for receiving the first clock signal, and a second electrode connected to the inverting control node; a fifth transistor including a gate electrode for receiving the first clock signal, a first electrode for receiving a low gate voltage, and a second electrode connected to the inverting control node; a sixth transistor including a gate electrode connected to the inverting control node, a first electrode for receiving the high gate voltage, and a second electrode connected to a gate output node configured to output a first gate signal; a seventh transistor including a gate electrode connected to a second control node, a first electrode for receiving the second clock signal, and a second electrode connected to the gate output node; a first capacitor including a first electrode for receiving the high gate voltage and a second electrode connected to the inverting control node; and a second capacitor including a first electrode connected to the second control node and a second electrode connected to the gate output node.

In an embodiment of the present inventive concept, there is provided a display device including: a display panel including pixels; and a gate driver configured to provide gate signals to the display panel, wherein the gate driver includes first to N-th stages (where N is a positive integer of 3 or more) for receiving first to N-th clock signals from first to N-th clock lines, wherein the first stage includes a first clock terminal for receiving the first clock signal, a second clock terminal for receiving a second clock signal, a carry terminal for receiving a vertical start signal, and an output terminal for outputting a first gate signal, wherein an N−K-th stage (where K is a positive integer between 1 and N−2) includes a first clock terminal for receiving an N−K-th clock signal, a second clock terminal for receiving an N−K+1-th clock signal, a carry terminal for receiving an N−K−1-th gate signal, and an output terminal for outputting an N−K-th gate signal, and wherein the N-th stage includes a first clock terminal for receiving the N-th clock signal, a second clock terminal for receiving the first clock signal, a carry terminal for receiving an N−1-th gate signal, and an output terminal for outputting an N-th gate signal.

When N is 4, the gate driver includes: a first stage including a first clock terminal for receiving the first clock signal, a second clock terminal for receiving a second clock signal, a carry terminal for receiving the vertical start signal, and an output terminal for outputting a first gate signal; a second stage including a first clock terminal for receiving the second clock signal, a second clock terminal for receiving a third clock signal, a carry terminal for receiving the first gate signal, and an output terminal for outputting a second clock signal; a third stage including a first clock terminal for receiving the third clock signal, a second clock terminal for receiving a fourth clock signal, a carry terminal for receiving the second gate signal, and an output terminal for outputting a third gate signal; and a fourth stage including a first clock terminal for receiving the fourth clock signal, a second clock terminal for receiving the first clock signal, a carry terminal for receiving the third gate signal, and an output terminal for outputting a fourth gate signal.

An activation period of each of the first to N-th clock signals does not overlap with each other.

According to the gate driver and the display device including the gate driver, the number of clock signals received by stages may be increased. Consequently, the frequency of each of the clock signals may be reduced, leading to decreased power consumption of each clock signal and the gate driver. Additionally, reducing the number of stages connected to the clock lines that provide the clock signals can lower the capacitance of the equivalent capacitor viewed from the clock lines. This reduction further decreases the power consumption of each clock signal and the gate driver.

BRIEF DESCRIPTION OF THE DRAWINGS

The above and other features of the present inventive concept will become more apparent by describing in detail embodiments thereof with reference to the accompanying drawings, in which.

DETAILED DESCRIPTION OF THE EMBODIMENTS

Hereinafter, the present inventive concept will be described in more detail with reference to the accompanying drawings.

Figure 1:
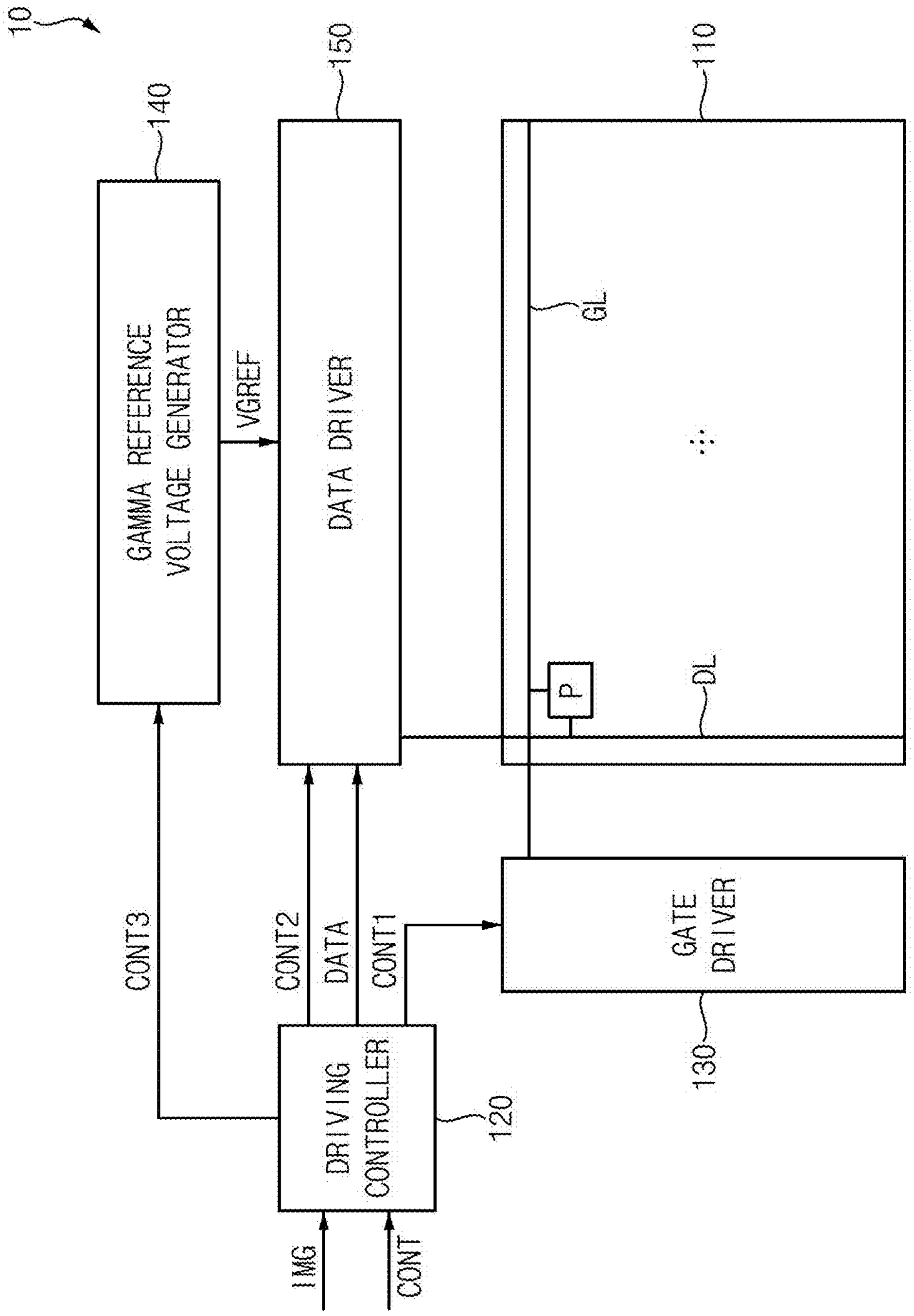
FIG. 1 is a block diagram illustrating a display device according to embodiments of the present inventive concept.

FIG. 1 is a block diagram illustrating a display device according to embodiments of the present inventive concept.

Referring to FIG. 1, the display device 10 may include a display panel 110 and a display panel driver. The display panel driver may include a driving controller 120, a gate driver 130, a gamma reference voltage generator 140, and a data driver 150.

For example, the driving controller 120 and the data driver 150 may be integrally formed. Similarly, the driving controller 120, the gamma reference voltage generator 140, and the data driver 150 may be integrally formed. Additionally, the driving controller 120, the gate driver 130, the gamma reference voltage generator 140, and the data driver 150 may be integrally formed. A driving module that includes at least the integrally formed driving controller 120 and data driver 150 may be referred to as a timing controller embedded data driver (TED).

The display panel 110 may include a display area for displaying an image and a peripheral area disposed adjacent to the display area.

For example, the display panel 110 may be an organic light emitting diode display panel including organic light emitting diodes. For example, the display panel 110 may be a quantum-dot organic light emitting diode display panel including organic light emitting diodes and quantum-dot color filters. For example, the display panel 110 may be a quantum-dot nano light emitting diode display panel including nano light emitting diodes and quantum-dot color filters.

The display panel 110 may include gate lines GL, data lines DL, and pixels P electrically connected to the gate lines GL and the data lines DL, respectively. The gate lines GL may extend in a first direction, the data lines DL may extend in a second direction crossing the first direction.

The driving controller 120 may receive input image data IMG and an input control signal CONT from an external device. For example, the input image data IMG may include red image data, green image data and blue image data. The input image data IMG may include white image data. The input image data IMG may include magenta image data, yellow image data, and cyan image data. The input control signal CONT may include a master clock signal and a data enable signal. The input control signal CONT may further include a vertical synchronization signal and a horizontal synchronization signal.

The driving controller 120 may generate a first control signal CONT1, a second control signal CONT2, a third control signal CONT3, and a data signal DATA based on the input image data IMG and the input control signal CONT.

The driving controller 120 may generate the first control signal CONT1, which controls the operation of the gate driver 130 based on the input control signal CONT, and output the first control signal CONT1 to the gate driver 130. The first control signal CONT1 may include a vertical start signal and a gate clock signal.

The driving controller 120 may generate the second control signal CONT2, which controls the operation of the data driver 150 based on the input control signal CONT, and output the second control signal CONT2 to the data driver 150. The second control signal CONT2 may include a horizontal start signal and a load signal.

The driving controller 120 may generate the data signal DATA based on the input image data IMG. The driving controller 120 may output the data signal DATA to the data driver 150.

The driving controller 120 may generate the third control signal CONT3, which controls the operation of the gamma reference voltage generator 140 based on the input control signal CONT, and output the third control signal CONT3 to the gamma reference voltage generator 140.

The gate driver 130 may generate gate signals to drive the gate lines GL in response to the first control signal CONT1 received from the driving controller 120. The gate driver 130 may output the gate signals to the gate lines GL.

In an embodiment, the gate driver 130 may be integrated on the peripheral area of the display panel 110.

The gamma reference voltage generator 140 may generate a gamma reference voltage VGREF in response to the third control signal CONT3 received from the driving controller 120. The gamma reference voltage generator 140 may provide the gamma reference voltage VGREF to the data driver 150. The gamma reference voltage VGREF may have a value corresponding to each data signal DATA.

In an embodiment, the gamma reference voltage generator 140 may be located within the driving controller 120 or the data driver 150.

The data driver 150 may receive the second control signal CONT2 and the data signal DATA from the driving controller 120, and receive the gamma reference voltage VGREF from the gamma reference voltage generator 140. The data driver 150 may convert the data signal DATA into an analog data voltage using the gamma reference voltage VGREF. The data driver 150 may output the data voltage to the data line DL.

Figure 2A:
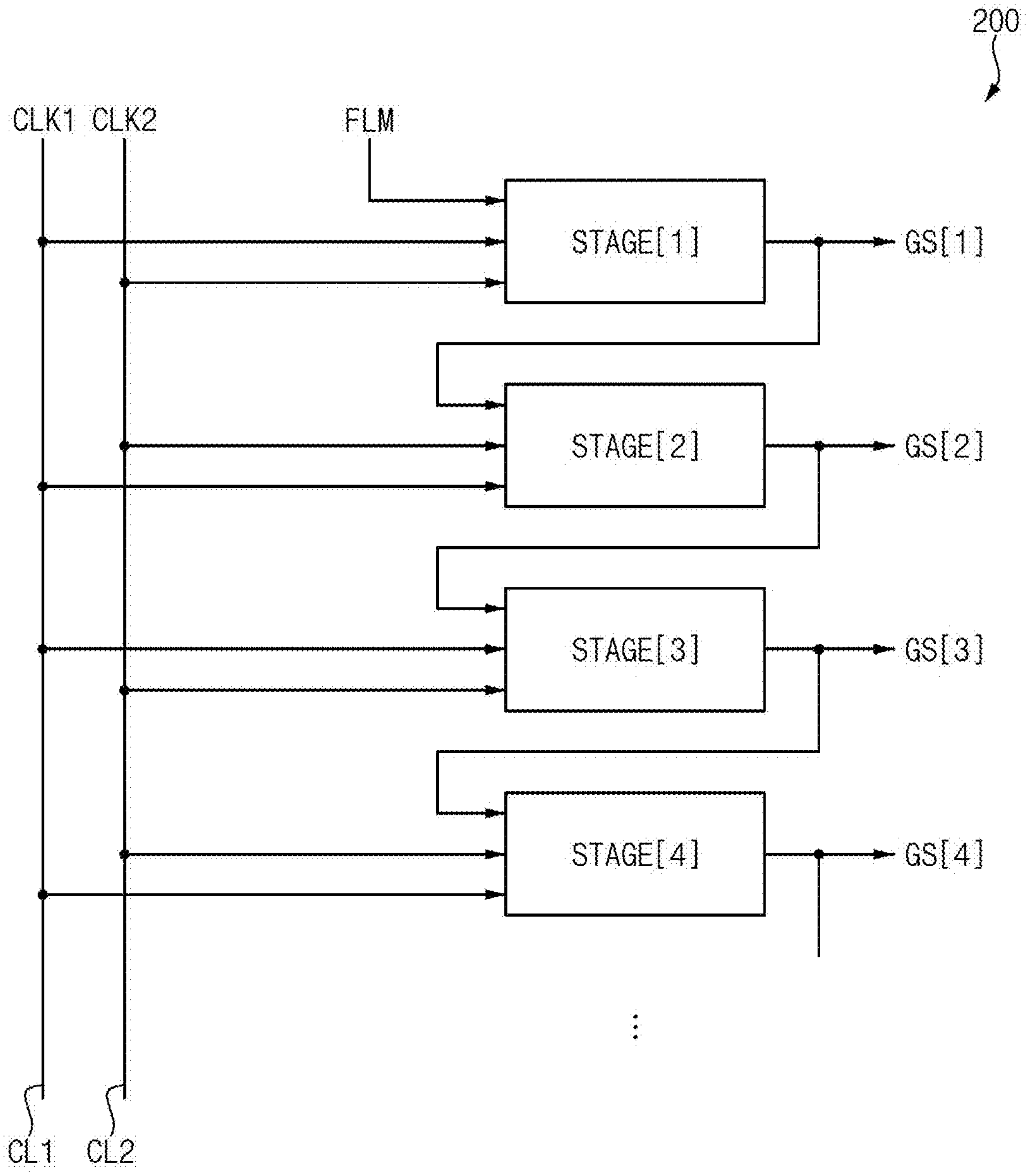
FIG. 2A is a block diagram illustrating a gate driver according to a comparative example.

FIG. 2A is a block diagram illustrating a gate driver according to a comparative example.

Referring to FIG. 2A, the gate driver 200 in the comparative example may include a plurality of stages that output a plurality of gate signals. The number of stages may be greater than or equal to a number of pixel rows. In FIG. 2A, first to fourth stages STAGE[1] to STAGE[4] are shown to explain the operation of the gate driver 200 in the comparative example.

The gate driver 200 in the comparative example may include the first to fourth stages STAGE[1] to STAGE[4] which receive first and second clock signals CLK1, CLK2 from first and second clock lines CL1, CL2.

The first stage STAGE[1] may include a first clock terminal for receiving the first clock signal CLK1, a second clock terminal for receiving the second clock signal CLK2, a carry terminal for receiving a vertical start signal FLM as an input signal, and an output terminal for outputting a first gate signal GS[1]. The second stage STAGE[2] may include a first clock terminal for receiving the second clock signal CLK2, a second clock terminal for receiving the first clock signal CLK1, a carry terminal for receiving the first gate signal GS[1] as the input signal, and an output terminal for outputting a second gate signal GS[2]. The third stage STAGE[3] may include a first clock terminal for receiving the first clock signal CLK1, a second clock terminal for receiving the second clock signal CLK2, a carry terminal for receiving the second gate signal GS[2] as the input signal, and an output terminal for outputting a third gate signal GS[3]. The fourth stage STAGE[4] may include a first clock terminal for receiving the second clock signal CLK2, a second clock terminal for receiving the first clock signal CLK1, a carry terminal for receiving the third gate signal GS[3] as the input signal, and an output terminal for outputting a fourth gate signal GS[4].

As such, the first stage STAGE[1] may receive the vertical start signal FLM, while subsequent stages, STAGE[2], STAGE[3], STAGE[4], . . . may receive the gate signals GS[1], GS[2], GS[3], GS[4], . . . , from each preceding stage as the input signal. Additionally, the method of applying the first and second clock signals CLK1, CLK2 may be repeated every two stages.

Figure 2B:
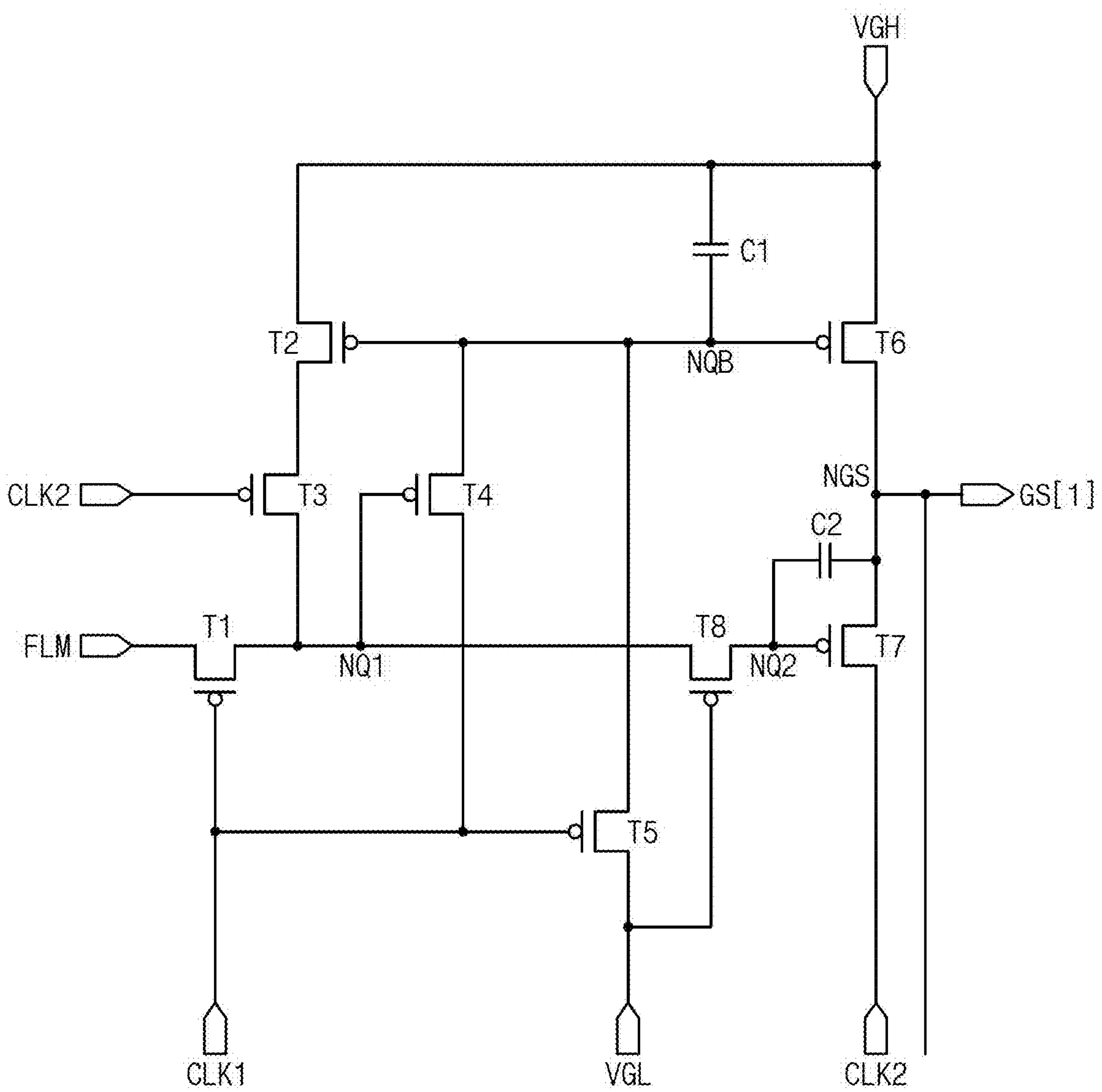
FIG. 2B is a circuit diagram illustrating a first stage of the gate driver of FIG. 2A.

FIG. 2B is a circuit diagram illustrating the first stage of the gate driver of FIG. 2A.

Referring to FIGS. 2A and 2B, the first stage STAGE[1] may include first to eighth transistors T1 to T8, a first capacitor C1, and a second capacitor C2.

The first transistor T1 may include a gate electrode for receiving the first clock signal CLK1, a first electrode for receiving the vertical start signal FLM, and a second electrode connected to a first control node NQ1. The second transistor T2 may include a gate electrode connected to an inverting control node NQB, a first electrode for receiving a high gate voltage VGH, and a second electrode connected to the third transistor T3. The third transistor T3 may include a gate electrode for receiving the second clock signal CLK2, a first electrode connected to the second electrode of the second transistor T2, and a second electrode connected to the first control node NQ1. The fourth transistor T4 may include a gate electrode connected to the first control node NQ1, a first electrode for receiving the first clock signal CLK1, and a second electrode connected to the inverting control node NQB. The fifth transistor T5 may include a gate electrode for receiving the first clock signal CLK1, a first electrode receiving a low gate voltage VGL, and a second electrode connected to the inverting control node NQB. The sixth transistor T6 may include a gate electrode connected to the inverting control node NQB, a first electrode for receiving the high gate voltage VGH, and a second electrode connected to a gate output node NGS for outputting the first gate signal GS[1]. The seventh transistor T7 may include a gate electrode connected to the second control node NQ2, a first electrode for receiving the second clock signal CLK2, and a second electrode connected to the gate output node NGS. The eighth transistor T8 may include a gate electrode for receiving the low gate voltage VGL, a first electrode connected to the first control node NQ1, and a second electrode connected to the second control node NQ2.

The first capacitor C1 may include a first electrode for receiving the high gate voltage VGH and a second electrode connected to the inverting control node NQB. The second capacitor C2 may include a first electrode connected to the second control node NQ2 and a second electrode connected to the gate output node NGS.

Figure 2C:
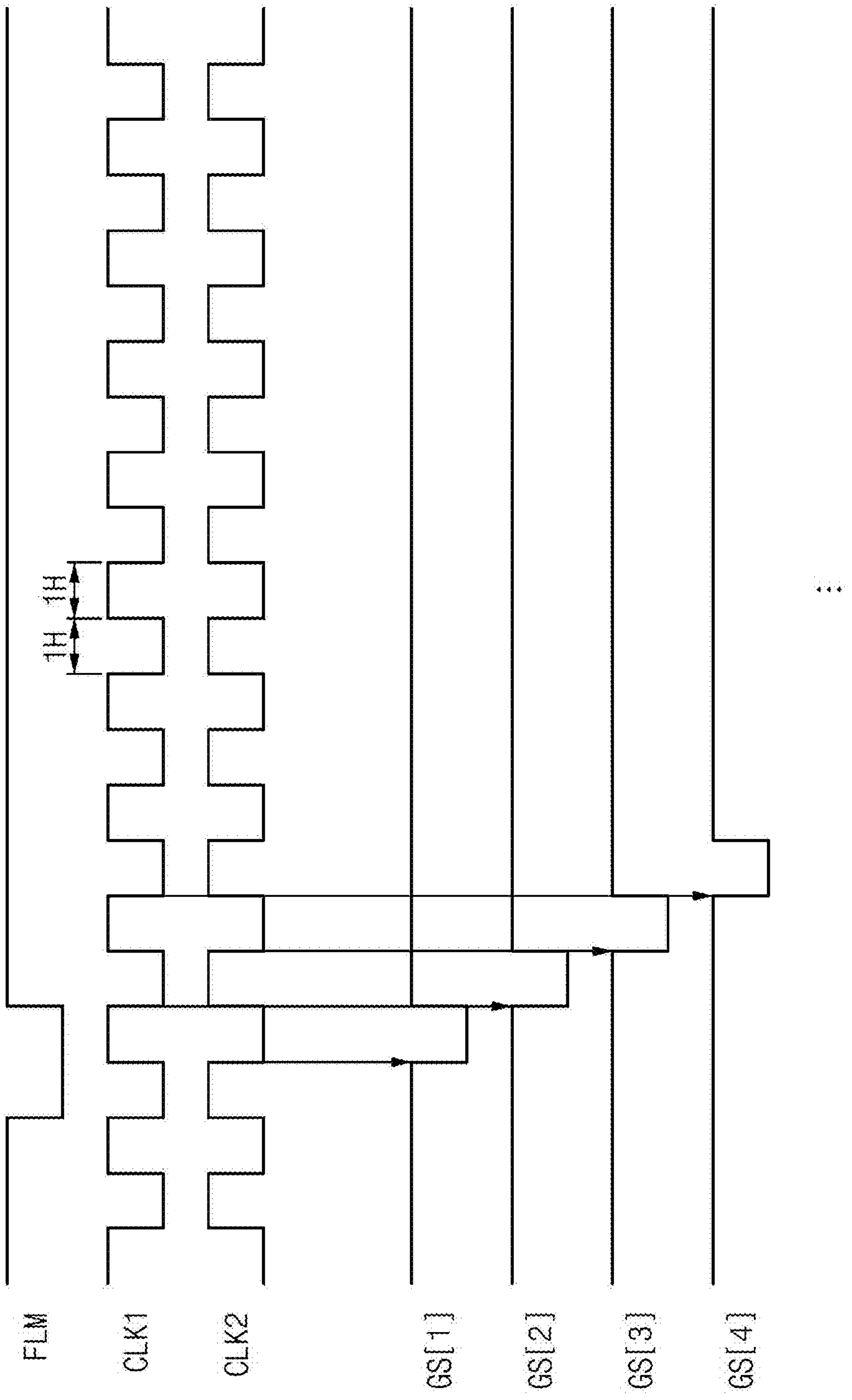
FIG. 2C is a timing diagram illustrating an operation of the gate driver of FIG. 2A.

FIG. 2C is a timing diagram illustrating the operation of the gate driver of FIG. 2A.

Referring to FIGS. 2A to 2C, each of the first and second clock signals CLK1, CLK2 may alternatively have activation and deactivation periods, with the activation periods of the first and second clock signals CLK1, CLK2 not overlapping. The length of both the activation and deactivation periods of the first and second clock signals CLK1, CLK2 may be 1 horizontal time 1H, resulting in a period of 2 horizontal times 2H for each of the first and second clock signals CLK1, CLK2.

The first stage STAGE[1] may receive the vertical start signal FLM based on the first clock signal CLK1, and output the first gate signal GS[1] based on the second clock signal CLK2. The second stage STAGE[2] may receive the first gate signal GS[1] based on the second clock signal CLK2, and output the second gate signal GS[2] based on the first clock signal CLK1. The third stage STAGE[3] may receive the second gate signal GS[2] based on the first clock signal CLK1, and output the third gate signal GS[3] based on the second clock signal CLK2. The fourth stage STAGE[4] may receive the third gate signal GS[3] based on the second clock signal CLK2, and output the fourth gate signal GS[4] based on the first clock signal CLK1.

The stages STAGE[1], STAGE[2], STAGE[3], STAGE[4], . . . may sequentially output gate signals GS[1], GS[2], GS[3], GS[4], . . . within one frame period.

A power consumption of a clock signal may be calculated using the following equation.

$$Pcl = Ceq \times V^2 \times f \qquad \text{[Equation]}$$

In the equation, Pcl is the power consumption of the clock signal, Ceq is the capacitance of an equivalent capacitor viewed from a clock line providing the clock signal, V is the voltage difference between the activation and deactivation periods of the clock signal, and f is a frequency of the clock signal. The equivalent capacitor viewed from the clock line providing the clock signal is proportional to the number of stages connected to the clock line. The period of each of the first and second clock signals CLK1, CLK2 is 2 horizontal times 2H, which is relatively short. Therefore, the frequency of each of the first and second clock signals CLK1, CLK2 is high, resulting in significant power consumption. Since the first and second clock lines CL1, CL2 providing the first and second clock signals CLK1, CLK2 are connected to all stages, the capacitance of the equivalent capacitor viewed from the first and second clock lines CL1, CL2 is large, leading to high power consumption for each of the first and second clock signals CLK1, CLK2.

Figure 3A:
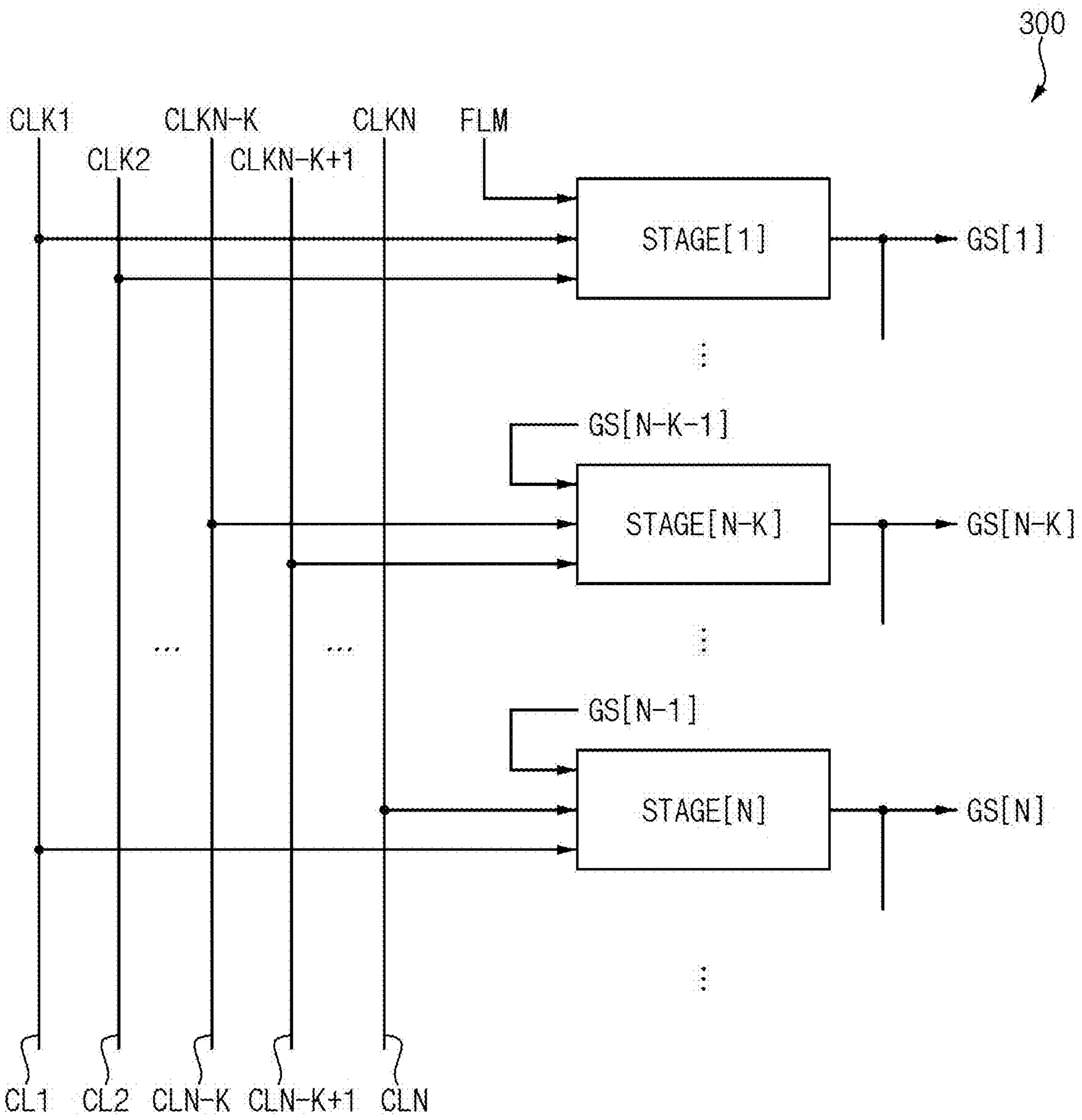
FIG. 3A is a block diagram illustrating a gate driver according to an embodiment.

FIG. 3A is a block diagram illustrating a gate driver according to an embodiment.

Referring to FIG. 3A, the gate driver 300 according to an embodiment may include a plurality of stages which output a plurality of gate signals. The number of stages may be greater than or equal to the number of pixel rows.

The stages may include first to N-th stages STAGE[1] to STAGE[N], which receive first to N-th clock signals CLK1 to CLKN, from first to N-th clock lines CL1 to CLN. Here, N is a positive integer of 3 or more.

The first stage STAGE[1] may include a first clock terminal for receiving the first clock signal CLK1, a second clock terminal for receiving a second clock signal CLK2, a carry terminal for receiving a vertical start signal FLM as an input signal, and an output terminal for outputting a first gate signal GS[1]. N−K-th stage STAGE[N−K] may include a first clock terminal for receiving N−K-th clock signal CLKN-K, a second clock terminal for receiving N−K+1-th clock signal CLKN-K+1, a carry terminal for receiving the N−K−1-th gate signal GS[N−K−1] as the input signal, and an output terminal for outputting N−K-th gate signal GS[N−K]. Here, K is a positive integer between 1 and N−2. The N-th stage STAGE[N] may include a first clock terminal for receiving the N-th clock signal CLKN, a second clock terminal for receiving the first clock signal CLK1, a carry terminal for receiving N−1-th gate signal GS[N−1] as the input signal, and an output terminal for outputting N-th gate signal GS[N].

As such, the first stage STAGE[1] may receive the vertical start signal FLM, while subsequent stages may receive the gate signal from the preceding stage as the input signal. Additionally, the method of applying the first to N-th clock signals CLK1 to CLKN may be repeated in units of N stages.

Figure 3B:
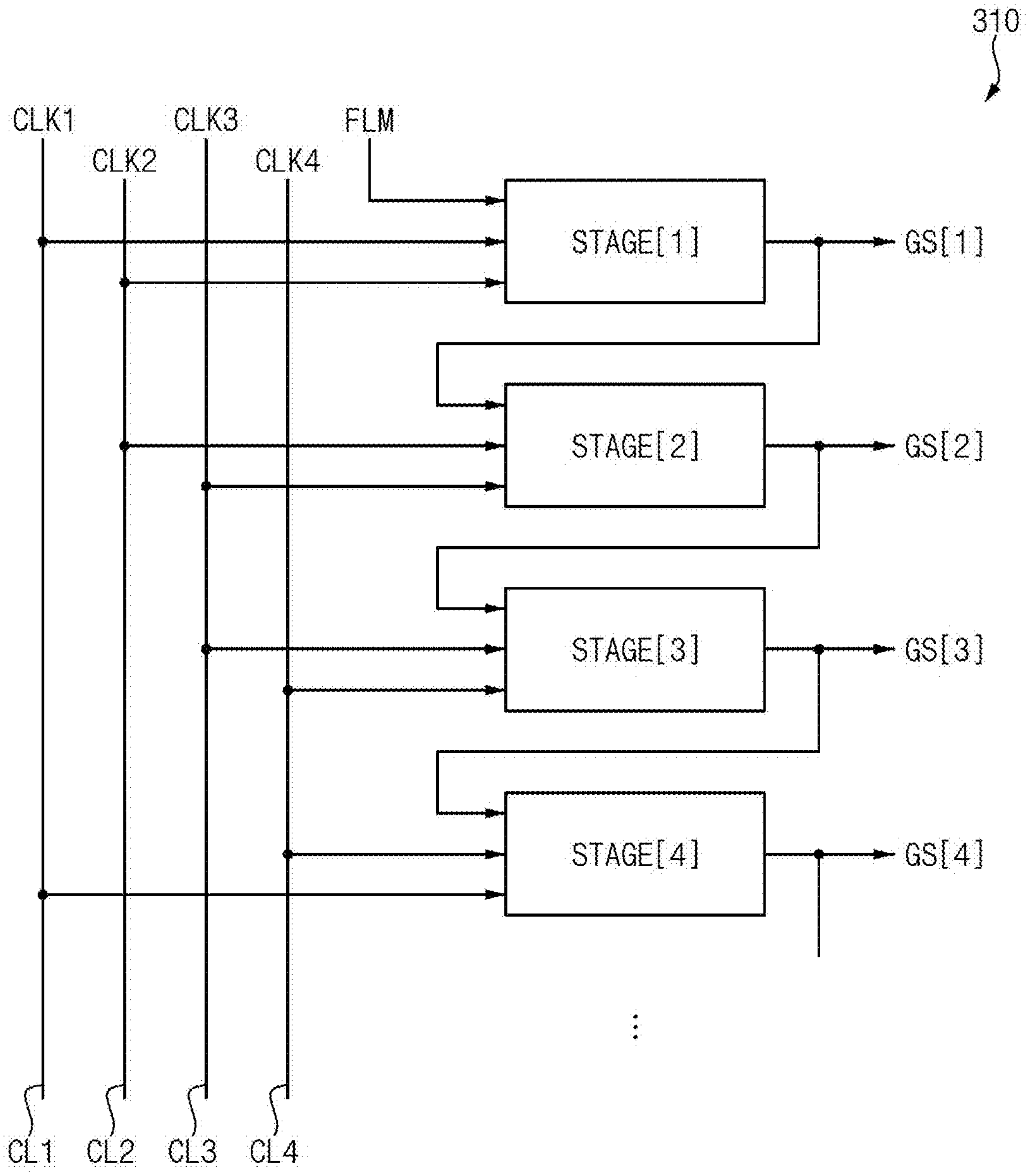
FIG. 3B is a block diagram illustrating the gate driver of FIG. 3A when Nis 4.

FIG. 3B is a block diagram illustrating the gate driver of FIG. 3A when Nis 4.

Referring to FIGS. 3A and 3B, in an embodiment, N may be 4. In FIG. 3B, first to fourth stages STAGE[1] to STAGE[4] are shown to explain the operation of the gate driver 310 when Nis 4.

The first stage STAGE[1] may include a first clock terminal for receiving the first clock signal CLK1, a second clock terminal for receiving a second clock signal CLK2, a carry terminal for receiving the vertical start signal FLM as the input signal, and an output terminal for outputting a first gate signal GS[1]. The second stage STAGE[2] may include a first clock terminal for receiving the second clock signal CLK2, a second clock terminal for receiving a third clock signal CLK3, a carry terminal for receiving the first gate signal GS[1] as the input signal. The third stage STAGE[3] may include a first clock terminal for receiving the third clock signal CLK3, a second clock terminal for receiving a fourth clock signal CLK4, a carry terminal for receiving the second gate signal GS[2] as the input signal, and an output terminal for outputting a third gate signal GS[3]. The fourth stage STAGE[4] may include a first clock terminal for receiving the fourth clock signal CLK4, a second clock terminal for receiving the first clock signal CLK1, a carry terminal for receiving the third gate signal GS[3], and an output terminal for outputting a fourth gate signal GS[4].

As such, the first stage STAGE[1] may receive the vertical start signal FLM, while subsequent stages STAGE[2], STAGE[3], STAGE[4], . . . may receive the gate signals GS[1], GS[2], GS[3], GS[4], . . . from the preceding stage as the input signal. Additionally, the method of applying the first to fourth clock signals CLK1 to CLK4 may be repeated in units of four stages.

Figure 3C:
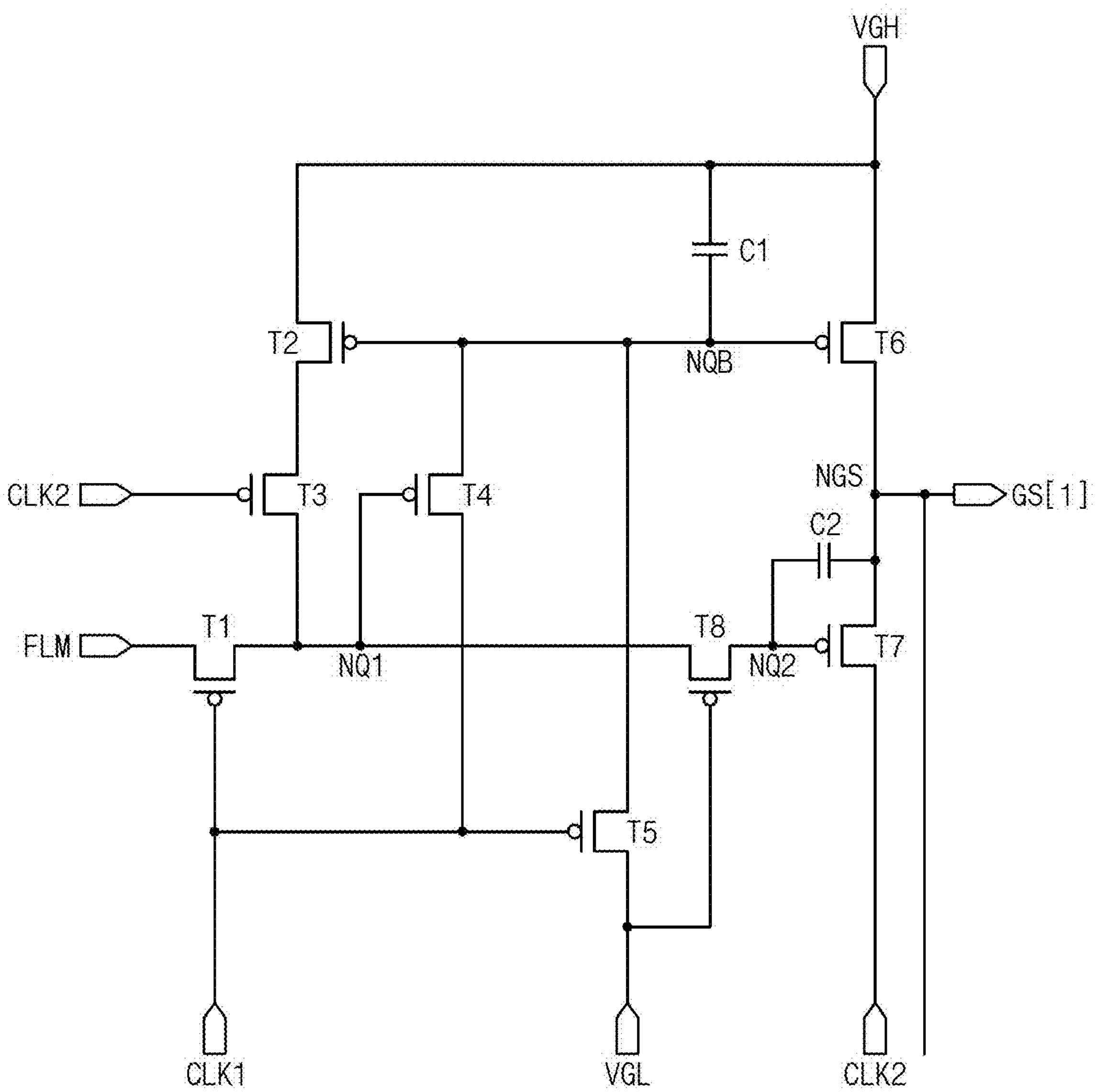
FIG. 3C is a circuit diagram illustrating a first stage of the gate driver of FIG. 3A.

FIG. 3C is a circuit diagram illustrating the first stage of the gate driver of FIG. 3A.

Referring to FIGS. 3A to 3C, the first stage STAGE[1] may include first to eighth transistors T1 to T8, a first capacitor C1, and a second capacitor C2.

The first transistor T1 may include a gate electrode for receiving the first clock signal CLK1, a first electrode for receiving the vertical start signal FLM, and a second electrode connected to a first control node NQ1. The second transistor T2 may include a gate electrode connected to an inverting control node NQB, a first electrode for receiving a high gate voltage VGH, and a second electrode connected to the third transistor T3. The third transistor T3 may include a gate electrode for receiving the second clock signal CLK2, a first electrode connected to the second electrode of the second transistor T2, and a second electrode connected to the first control node NQ1. The fourth transistor T4 may include a gate electrode connected to the first control node NQ1, a first electrode for receiving the first clock signal CLK1, and a second electrode connected to the inverting control node NQB. The fifth transistor T5 may include a gate electrode for receiving the first clock signal CLK1, a first electrode for receiving a low gate voltage VGL, and a second electrode connected to the inverting control node NQB. The sixth transistor T6 may include a gate electrode connected to the inverting control node NQB, a first electrode for receiving the high gate voltage VGH, and a second electrode connected to a gate output node NGS for outputting the first gate signal GS[1]. The seventh transistor T7 may include a gate electrode connected to a second control node NQ2, a first electrode for receiving the second clock signal CLK2, and a second electrode connected to the gate output node NGS. The eighth transistor T8 may include a gate electrode for receiving the low gate voltage VGL, a first electrode connected to the first control node NQ1, and a second electrode connected to the second control node NQ2.

The first capacitor C1 may include a first electrode for receiving the high gate voltage VGH and a second electrode connected to the inverting control node NQB. The second capacitor C2 may include a first electrode connected to the second control node NQ2 and a second electrode connected to the gate output node NGS.

Figure 3D:
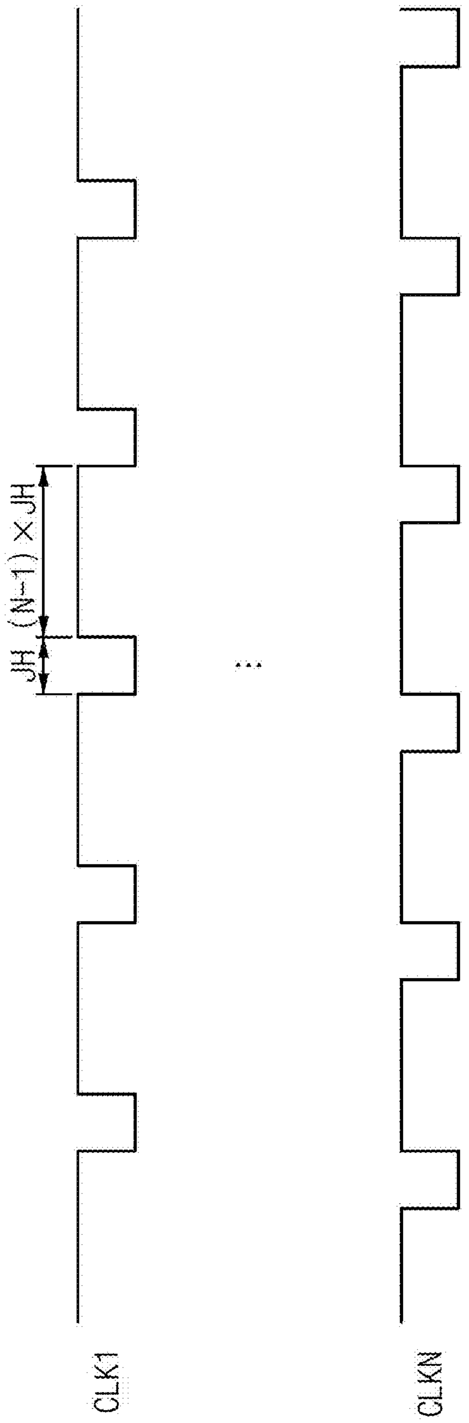
FIG. 3D is a timing diagram illustrating first to N-th clock signals of the gate driver of FIG. 3A.

FIG. 3D is a timing diagram illustrating first to N-th clock signals of the gate driver of FIG. 3A.

Referring to FIGS. 3A to 3D, in an embodiment, each of the first to N-th clock signals CLK1 to CLKN may have alternatively an activation period and a deactivation period, with the activation periods not overlapping. When the length of the activation period of each of the first to N-th clock signals CLK1 to CLKN is J horizontal time JH, the length of the deactivation period of each of the first to N-th clock signals CLK1 to CLKN is (N−1)×J horizontal time (N−1)×

JH, resulting in a period of N× J horizontal time N×JH for each of the first to N-th clock signals CLK1 to CLKN. Here, J is a positive number.

Figure 3E:
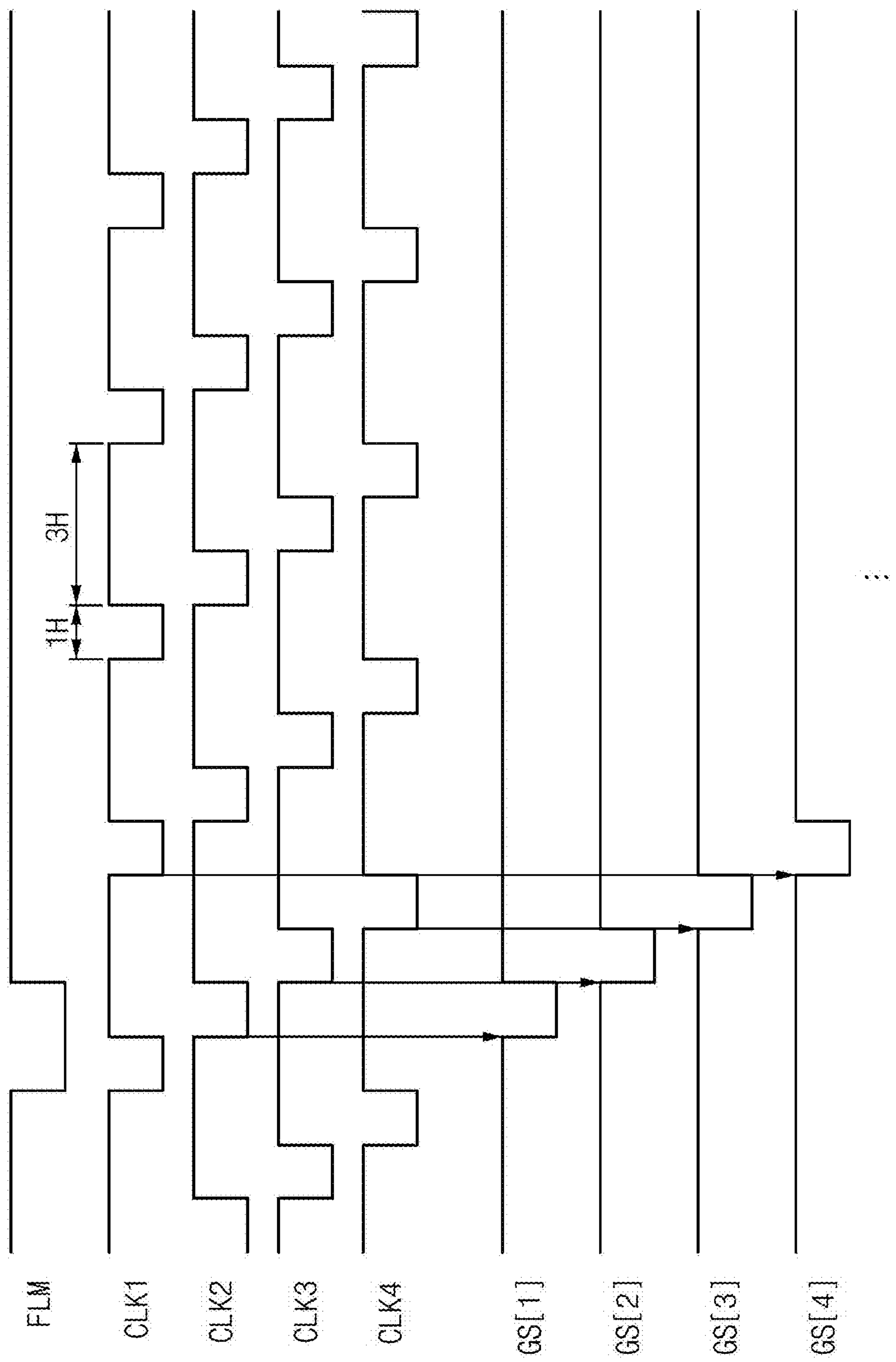
FIG. 3E is a timing diagram illustrating an operation of the gate driver of FIG. 3A when N is 4 and J is 1.

FIG. 3E is a timing diagram illustrating the operation of the gate driver of FIG. 3A when N is 4 and J is 1.

Referring to FIGS. 3A to 3E, in an embodiment, N may be 4 and J may be 1. In this case, the activation period of each of the first to N-th clock signals CLK1 to CLKN may be 1 horizontal time 1H, the deactivation period of each of the first to N-th clock signals may be 3 horizontal times 3H, and a period of each of the first to N-th clock signals CLK1 to CLKN may be 4 horizontal times 4H.

The first stage STAGE[1] may receive the vertical start signal FLM based on the first clock signal CLK1, and output the first gate signal GS[1] based on the second clock signal CLK2. The second stage STAGE[2] may receive the first gate signal GS[1] based on the second clock signal CLK2, and output the second gate signal GS[2] based on the third clock signal CLK3. The third stage STAGE[3] may receive the second gate signal GS[2] based on the third clock signal CLK3, and output the third gate signal GS[3] based on the fourth clock signal CLK4. The fourth stage STAGE[4] may receive the third gate signal GS[3] based on the fourth clock signal CLK4, and output the fourth gate signal GS[4] based on the first clock signal CLK1.

The stages STAGE[1], STAGE[2], STAGE[3], STAGE [4], . . . may sequentially output the gate signals GS[1], GS[2], GS[3], GS[4], . . . within one frame period.

The period of each of the first to fourth clock signals CLK1 to CLK4 may be 4 horizontal times 4H, which is relatively large. Therefore, the frequency of each of the first to fourth clock signals CLK1 to CLK4 may be low, resulting in low power consumption. Since the first to fourth clock lines CL1 to CL4 providing the first to fourth clock signals CLK1 to CLK4 are connected to half of the stages, the capacitance of the equivalent capacitor viewed from the first to fourth clock lines CL1 to CL4 is small, further reducing power consumption.

As such, when N is large, the period of each of the first to N-th clock signals CLK1 to CLKN may be large, leading to small the power consumption for each of the first to N-th clock signals CLK1 to CLKN. Additionally, when Nis large, the capacitance of the equivalent capacitor view from each of the first to N-th clock lines CL1 to CLN may be small, and further reducing the power consumption of each of the first to N-th clock signals CLK1 to CLKN.

Figure 3F:
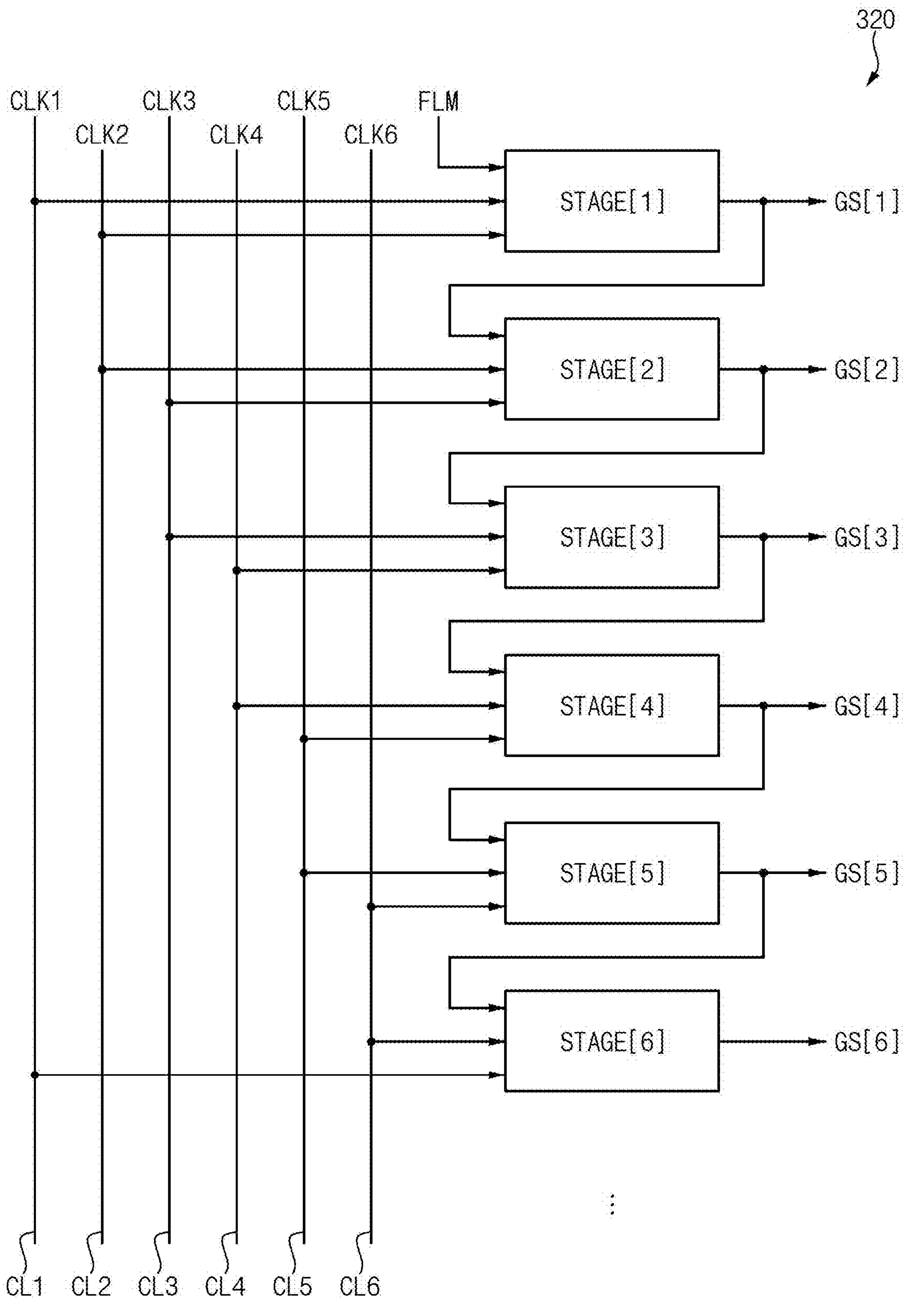
FIG. 3F is a block diagram illustrating the gate driver of FIG. 3A when Nis 6.

FIG. 3F is a block diagram illustrating the gate driver of FIG. 3A when Nis 6.

Referring to FIG. 3F, in an embodiment, N may be 6. In FIG. 3F, first to sixth stages STAGE[1] to STAGE[6] are shown to explain the operation of the gate driver 320 when Nis 6.

The first stage STAGE[1] may include a first clock terminal for receiving the first clock signal CLK1, a second clock terminal for receiving a second clock signal CLK2, a carry terminal for receiving the vertical start signal FLM as an input signal and an output terminal for outputting a first gate signal GS[1]. The second stage STAGE[2] may include a first clock terminal for receiving the second clock signal CLK2, a second clock terminal for receiving a third clock signal CLK3, a carry terminal for receiving the first gate signal GS[1] as the input signal, and an output terminal for outputting a second gate signal GS[2]. The third stage STAGE[3] may include a first clock terminal for receiving the third clock signal CLK3, a second clock terminal for receiving a fourth clock signal CLK4, a carry terminal for receiving the second gate signal GS[2] as the input signal, and an output terminal for outputting a third gate signal GS[3]. The fourth stage STAGE[4] may include a first clock terminal for receiving the fourth clock signal CLK4, a second clock terminal for receiving a fifth clock signal CLK5, a carry terminal for receiving the third gate signal GS[3] as the input signal, and an output terminal for outputting a fourth gate signal GS[4]. The fifth stage STAGE [5] may include a first clock terminal for receiving the fifth clock signal CLK5, a second clock terminal for receiving a sixth clock signal CLK6, a carry terminal for receiving the fourth gate signal GS[4] as the input signal, and an output terminal for outputting a fifth gate signal GS[5]. The sixth stage STAGE[6] may include a first clock terminal for receiving the sixth clock signal CLK6, a second clock terminal for receiving a first clock signal CLK1, a carry terminal for receiving the fifth gate signal GS[5] as the input signal, and an output terminal for outputting a sixth gate signal GS[6].

As such, the first stage STAGE[1] may receive the vertical start signal FLM, while subsequent stages STAGE[2], STAGE[3], STAGE[4], STAGE[5], STAGE[6], . . . may receive the gate signals GS[1], GS[2], GS[3], GS[4], GS[5], GS[6], . . . from the preceding stage as the input signal. Additionally, the method of applying the first to sixth clock signals CLK1 to CLK6 may be repeated in units of six stages.

In an embodiment, N may be 6 and J may be 1. In this case, the activation period of each of the first to N-th clock signals CLK1 to CLKN may be 1 horizontal time 1H, the deactivation period of each of the first to N-th clock signals may be 5 horizontal times 5H, and a period of each of the first to N-th clock signals CLK1 to CLKN may be 6 horizontal times 6H.

Since 6 horizontal times 6H is relatively large, the frequency of each of the first to sixth clock signals CLK1 to CLK6 may be low, resulting in small power consumption. Because the first to sixth clock lines CL1 to CL6 providing the first to sixth clock signals CLK1 to CLK6 are connected to one-third of the stages, the capacitance of the equivalent capacitor viewed from the first to sixth clock lines CL1 to CL6 is small, further reducing power consumption.

Figure 4A:
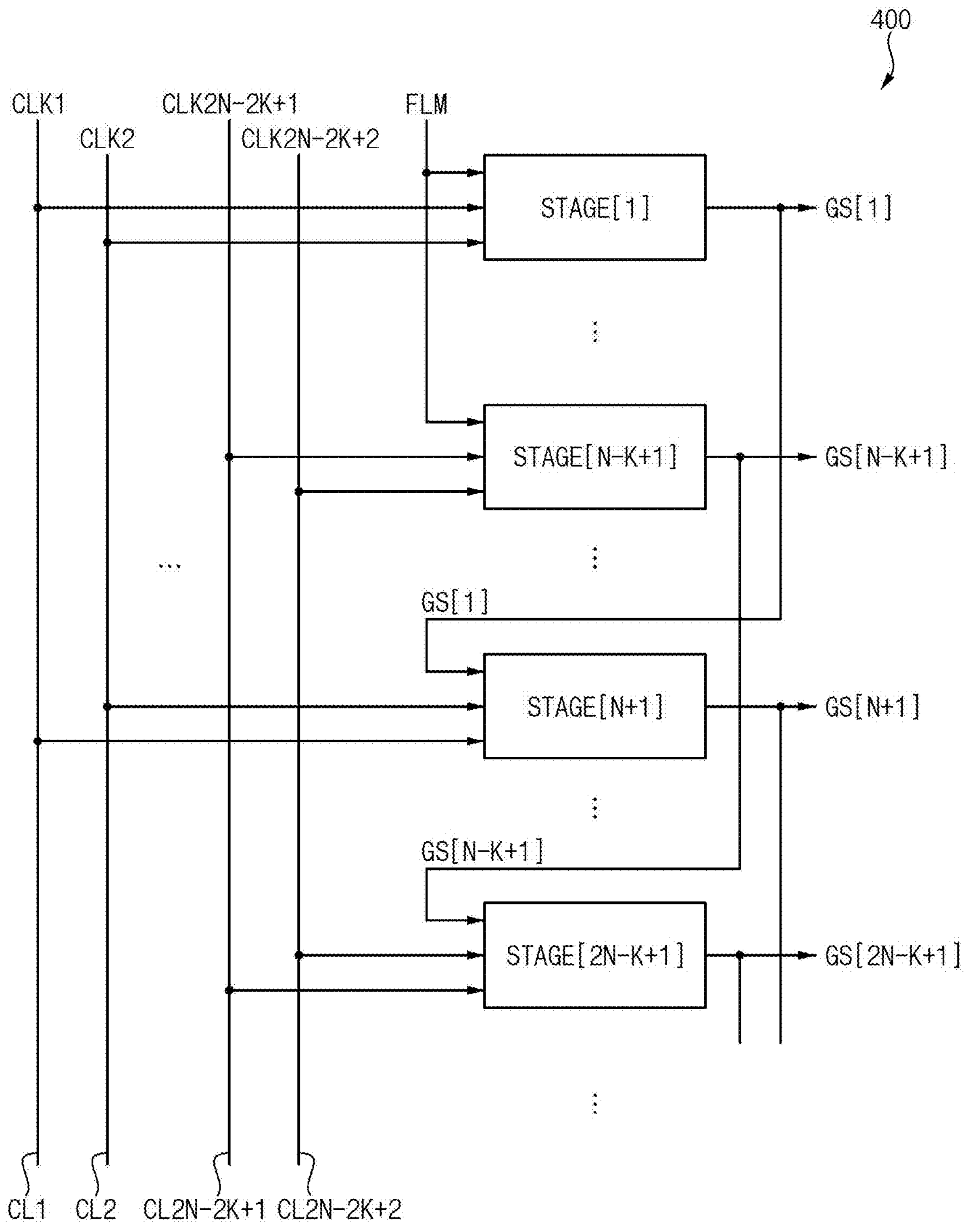
FIG. 4A is a block diagram illustrating a gate driver according to an embodiment.

FIG. 4A is a block diagram illustrating a gate driver according to an embodiment.

Referring to FIG. 4A, the gate driver 400 according to an embodiment may include a plurality of stages which output a plurality of gate signals. The number of stages may be greater than or equal to the number of pixel rows.

The stages may include first to 2N-th stages STAGE[1] to STAGE[2N] receiving first to 2N-th clock signals CLK1 to CLK2N from first to 2N-th clock lines CL1 to CL2N. Here, N is a positive integer of 2 or more.

An N−K+1-th stage STAGE[N−K+1] may include a first clock terminal for receiving a 2N−2K+1-th clock signal CLK2N−2K+1, a second clock terminal for receiving a 2N−2K+2-th clock signal CLK2N−2K+2, a carry terminal for receiving a vertical start signal FLM, and an output terminal for outputting an N−K+1-th gate signal GS[N−K+1]. Here, K is a positive integer between 1 and N or less. A 2N−K+1-th stage STAGE[2N−K+1] may include a first clock terminal for receiving the 2N−2K+2-th clock signal CLK2N−2K+2, and a second clock terminal for receiving the 2N−2K+1-th clock signal CLK2N−2K+1, a carry terminal for receiving the N−K+1-th gate signal GS[N−K+1], and an output terminal for outputting a 2N−K+1-th gate signal GS[2N−K+1].

As such, the first stage STAGE[1] may receive the vertical start signal FLM, and subsequent stages may receive gate signals of each previous stage as the input signal. Additionally, the method of applying the first to sixth clock signals CLK1 to CLK6 may be repeated in units of six stages.

Figure 4B:
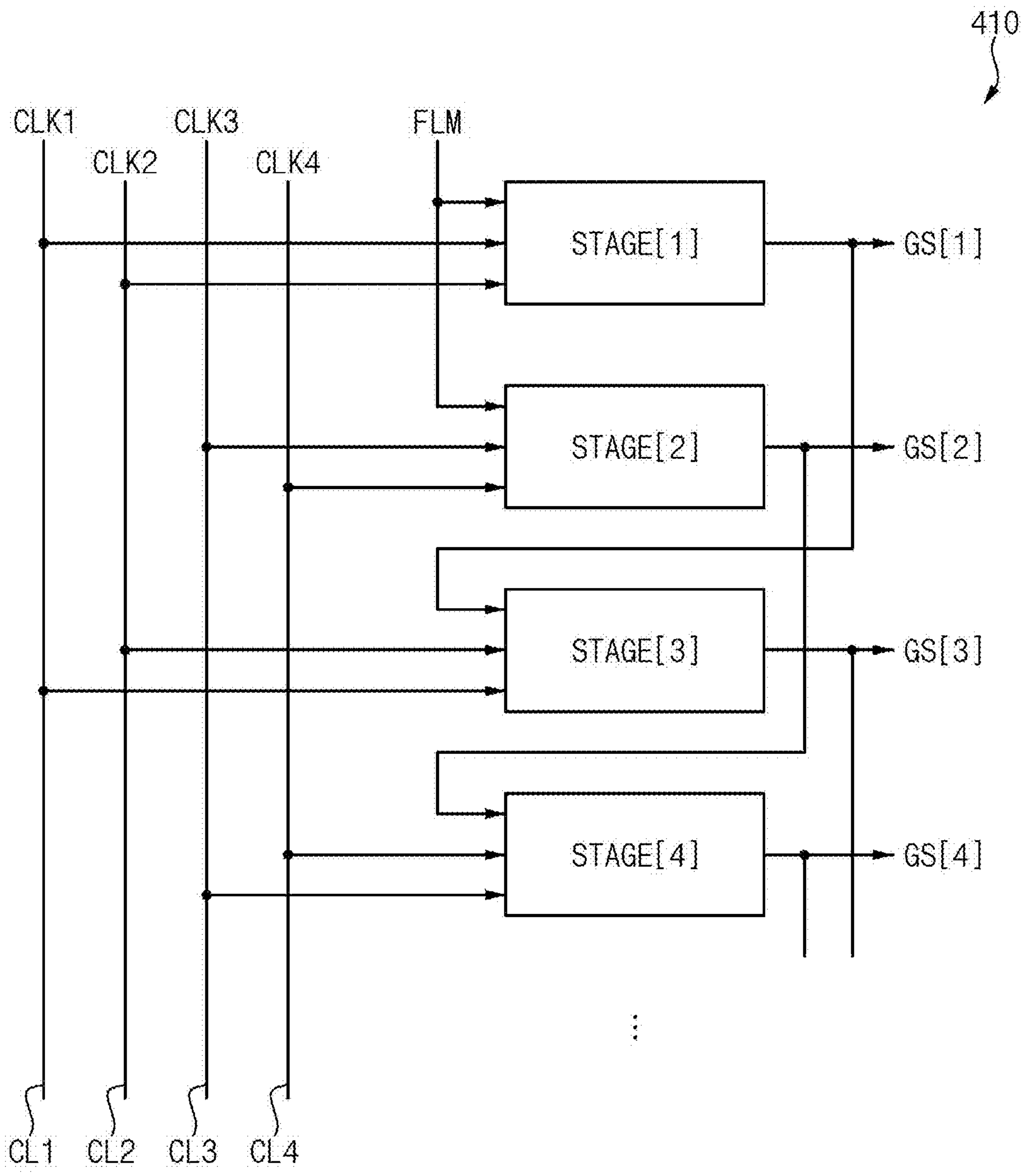
FIG. 4B is a block diagram illustrating the gate driver of FIG. 4A when Nis 2.

FIG. 4B is a block diagram illustrating the gate driver of FIG. 4A when Nis 2.

Referring to FIGS. 4A and 4B, in an embodiment, N may be 2. In FIG. 4B, first to fourth stages STAGE[1] to STAGE[4] are shown to explain the operation of the gate driver 410 when Nis 2.

The first stage STAGE[1] may include a first clock terminal for receiving the first clock signal CLK1, a second clock terminal for receiving a second clock signal CLK2, a carry terminal for receiving a vertical start signal FLM and an output terminal for outputting a first gate signal GS[1]. The second stage STAGE[2] may include a first clock terminal for receiving a third clock signal CLK3, a second clock terminal for receiving a fourth clock signal CLK4, a carry terminal for receiving the vertical start signal FLM, and an output terminal for outputting a second gate signal GS[2]. The third stage STAGE[3] may include a first clock terminal for receiving the second clock signal CLK2, a second clock terminal for receiving the first clock signal CLK1, a carry terminal for receiving the first gate signal GS[1] as the input signal, and an output terminal for outputting a third gate signal GS[3]. The fourth stage STAGE[4] may include a first clock terminal for receiving the fourth clock signal CLK4, a second clock terminal for receiving the third clock signal CLK3, a carry terminal for receiving the second gate signal GS[2] as the input signal, and an output terminal for outputting a fourth gate signal GS[4].

As such, the first stage STAGE[1] and the second stage STAGE[2] may receive the vertical start signal FLM, and subsequent stages STAGE[3], STAGE[4], . . . may receive the gate signals GS[1], GS[2], GS[3], GS[4], . . . of each previous stage as the input signal. Additionally, the method of applying the first to fourth clock signals CLK1 to CLK4 may be repeated in units of four stages.

Figure 4C:
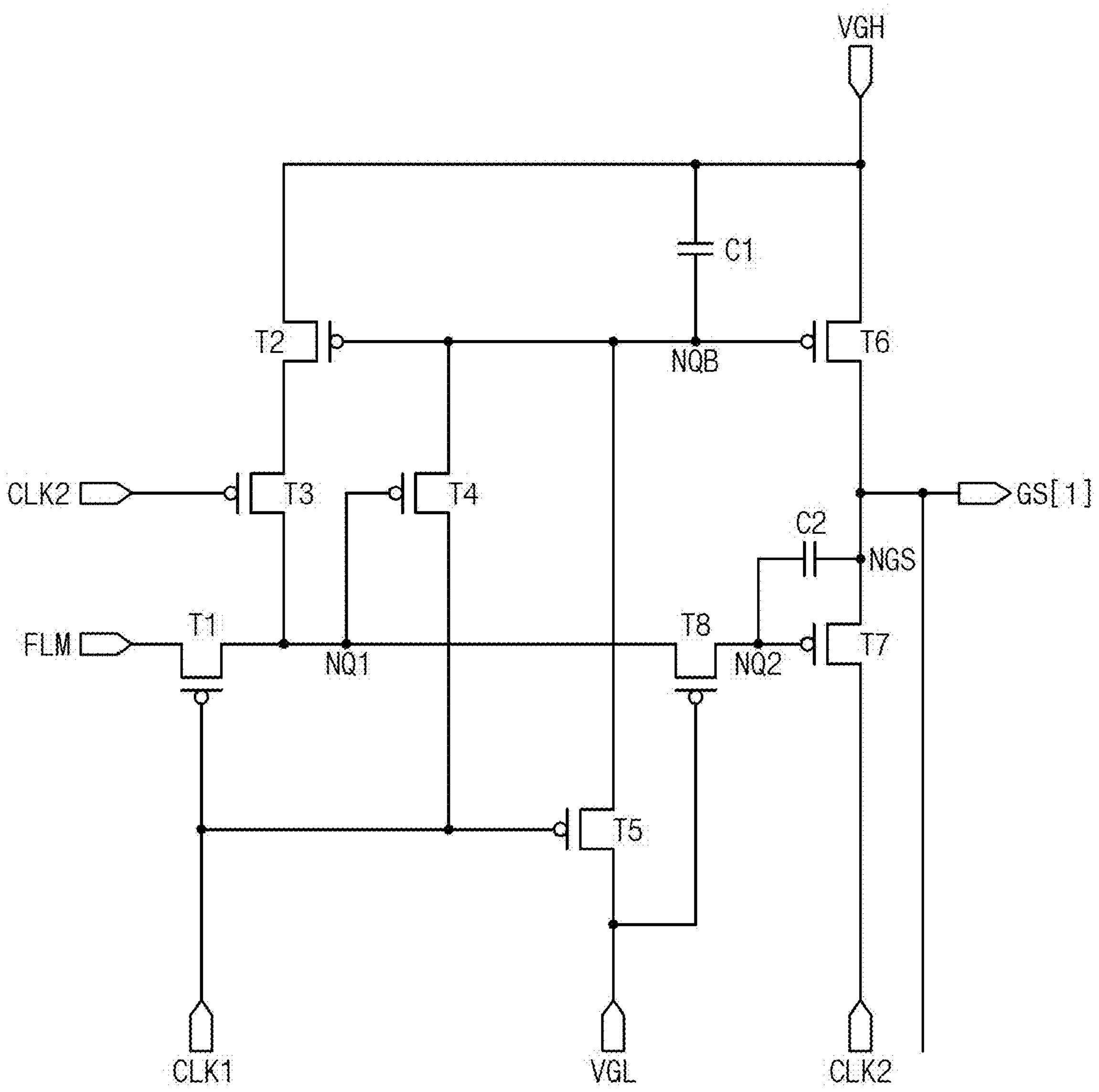
FIG. 4C is a circuit diagram illustrating a first stage of the gate driver of FIG. 4A.

FIG. 4C is a circuit diagram illustrating the first stage of the gate driver of FIG. 4A.

Referring to FIGS. 4A to 4C, the first stage STAGE[1] may include first to eighth transistors T1 to T8, a first capacitor C1, and a second capacitor C2.

The first transistor T1 may include a gate electrode for receiving the first clock signal CLK1, a first electrode for receiving the vertical start signal FLM, and a second electrode connected to a first control node NQ1. The second transistor T2 may include a gate electrode connected to an inverting control node NQB, a first electrode for receiving a high gate voltage VGH, and a second electrode connected to the third transistor T3. The third transistor T3 may include a gate electrode for receiving the second clock signal CLK2, a first electrode connected to the second electrode of the second transistor T2, and a second electrode connected to the first control node NQ1. The fourth transistor T4 may include a gate electrode connected to the first control node NQ1, a first electrode for receiving the first clock signal CLK1, and a second electrode connected to the inverting control node NQB. The fifth transistor T5 may include a gate electrode for receiving the first clock signal CLK1, a first electrode for receiving a low gate voltage VGL, and a second electrode connected to the inverting control node NQB. The sixth transistor T6 may include a gate electrode connected to the inverting control node NQB, a first electrode for receiving the high gate voltage VGH, and a second electrode connected to a gate output node NGS for outputting the first gate signal GS[1]. The seventh transistor T7 may include a gate electrode connected to the second control node NQ2, a first electrode for receiving the second clock signal CLK2, and a second electrode connected to the gate output node NGS. The eighth transistor T8 may include a gate electrode for receiving the low gate voltage VGL, a first electrode connected to the first control node NQ1, and a second electrode connected to the second control node NQ2.

The first capacitor C1 may include a first electrode for receiving the high gate voltage VGH and a second electrode connected to the inverting control node NQB. The second capacitor C2 may include a first electrode connected to the second control node NQ2 and a second electrode connected to the gate output node NGS.

Figure 4D:
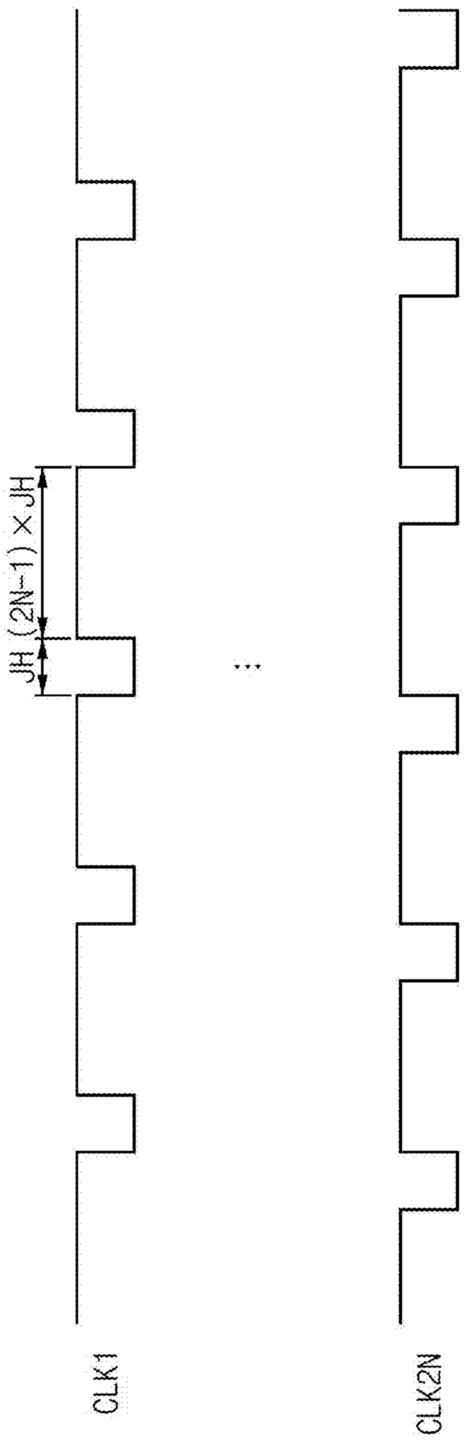
FIG. 4D is a timing diagram illustrating first to 2N-th clock signals of the gate driver of FIG. 4A.

FIG. 4D is a timing diagram illustrating first to 2N-th clock signals of the gate driver of FIG. 4A.

Referring to FIGS. 4A to 4D, in an embodiment, each of the first to 2N-th clock signals CLK1 to CLK2N may alternatively have an activation period and a deactivation period, with the activation periods not overlapping. In an embodiment, when the length of the activation period of each of the first to 2N-th clock signals CLK1 to CLK2N is J horizontal time JH, the length of the deactivation period of each of the first to 2N-th clock signals CLK1 to CLK2N is (2N−1)×J horizontal time (2N−1)× JH, resulting in a period of 2N× J horizontal time 2N×JH for each of the first to N-th clock signals CLK1 to CLKN. Here, J is a positive number.

Figure 4E:
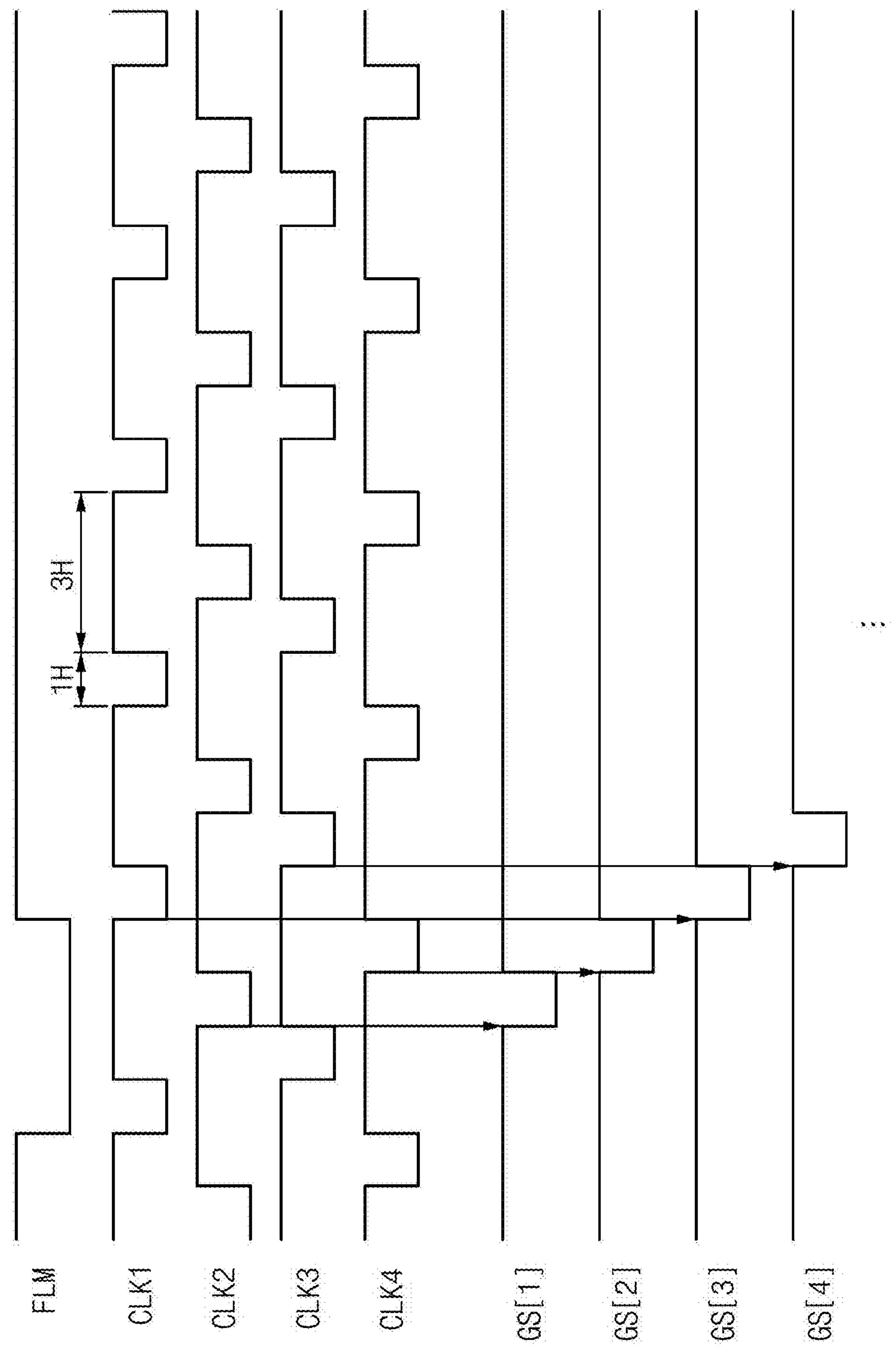
FIG. 4E is a timing diagram illustrating an operation of the gate driver of FIG. 4A when N is 2 and J is 1.

FIG. 4E is a timing diagram illustrating an operation of the gate driver of FIG. 4A when N is 2 and J is 1.

Referring to FIGS. 4A to 4E, in an embodiment, N may be 2 and J may be 1. In this case, the length of the activation period of each of the first to 2N-th clock signals CLK1 to CLK2N may be 1 horizontal time 1H, the length of the deactivation period of each of the first to 2N-th clock signals CLK1 to CLK2N may be 3 horizontal times 3H, and a period of each of the first to 2N-th clock signals CLK1 to CLK2N may be 4 horizontal times 4H.

The first stage STAGE[1] may receive the vertical start signal FLM based on the first clock signal CLK1, and output the first gate signal GS[1] based on the second clock signal CLK2. The second stage STAGE[2] may receive the vertical start signal FLM based on the third clock signal CLK3, and output the second gate signal GS[2] based on the fourth clock signal. The third stage STAGE[3] may receive the first gate signal GS[1] based on the second clock signal CLK2, and output the third gate signal GS[3] based on the first clock signal CLK1. The fourth stage STAGE[4] may receive the second gate signal GS[2] based on the fourth clock signal CLK4, and output the fourth gate signal GS[4] based on the third clock signal CLK3.

The stages STAGE[1], STAGE[2], STAGE[3], STAGE [4], . . . may sequentially output the gate signals GS[1], GS[2], GS[3], GS[4], . . . within one frame period.

The period of each of the first to fourth clock signals CLK1 to CLK4 may be 4 horizontal times 4H, which is relatively long. Therefore, the frequency of each of the first to fourth clock signals CLK1 to CLK4 is low, resulting in low power consumption. Since the first to fourth clock lines CL1 to CL4 providing the first to fourth clock signals CLK1 to CLK4 are connected to half of the stages, the capacitance of the equivalent capacitor viewed from the first to fourth clock lines CL1 to CL4 is small, further reducing power consumption.

As such, when Nis large, the period of each of the first to 2N-th clock signals CLK1 to CLK2N may be long, leading to low power consumption. Additionally, when N is large, the capacitance of the equivalent capacitor viewed from each of the first to 2N-th clock lines CL1 to CL2N may be small, further reducing power consumption.

Figure 4F:
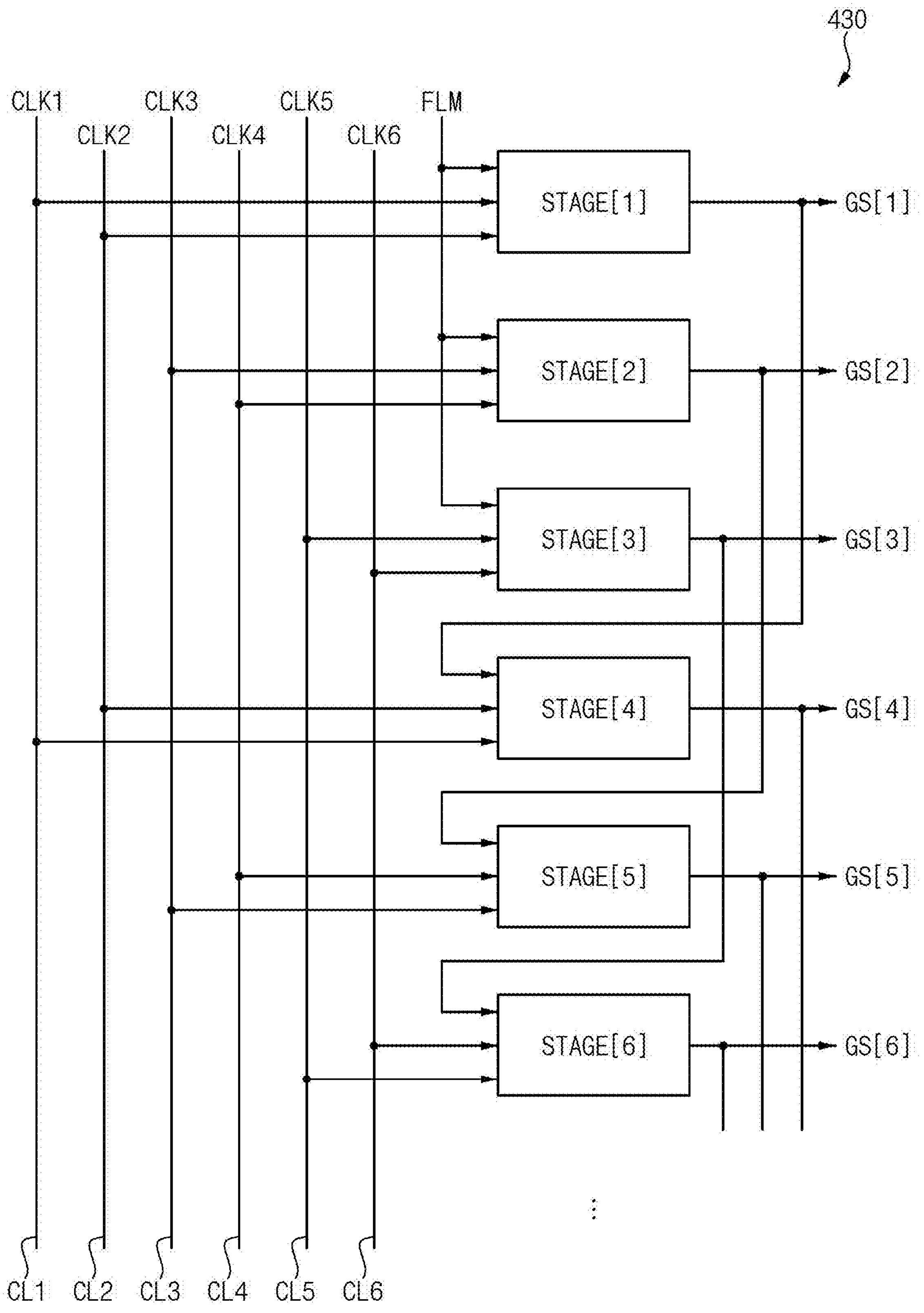
FIG. 4F is a block diagram illustrating the gate driver of FIG. 4A when Nis 3.

FIG. 4F is a block diagram illustrating the gate driver of FIG. 4A when Nis 3.

Referring to FIG. 4F, in an embodiment, N may be 3. In FIG. 4F, first to sixth stages STAGE[1] to STAGE[6] are shown to explain the operation of the gate driver 430 when Nis 3.

The first stage STAGE[1] may include a first clock terminal for receiving the first clock signal CLK1, a second clock terminal for receiving a second clock signal CLK2, a carry terminal for receiving the vertical start signal FLM as the input signal, an output terminal for outputting a first gate signal GS[1]. The second stage STAGE[2] may include a first clock terminal for receiving a third clock signal CLK3, a second clock terminal for receiving a fourth clock signal CLK4, a carry terminal for receiving the vertical start signal FLM as the input signal and an output terminal for outputting a second gate signal GS[2]. The third stage STAGE[3] may include a first clock terminal for receiving a fifth clock signal CLK5, a second clock terminal for receiving a sixth clock signal CLK6, a carry terminal for receiving the vertical start signal FLM, and an output terminal for outputting a third gate signal GS[3]. The fourth stage STAGE [4] may include a first clock terminal for receiving the second clock signal CLK2, a second clock terminal for receiving the first clock signal CLK1, a carry terminal for receiving the first gate signal GS[1] as the input signal, and an output terminal for outputting a fourth gate signal GS[4]. The fifth stage STAGE[5] may include a first clock terminal for receiving the fourth clock signal CLK4, a second clock terminal for receiving the third clock signal CLK3, a carry terminal for receiving the second gate signal GS[2] as the input signal, and an output terminal for outputting a fifth gate signal GS[5]. The sixth stage STAGE[6] may include a first clock terminal for receiving the sixth clock signal CLK6, a second clock terminal for receiving the fifth clock signal CLK5, a carry terminal for receiving the third gate signal GS[3], and an output terminal for outputting a sixth gate signal GS[6].

As such, the first to third stages STAGE[1] to STAGE[3] may receive the vertical start signal FLM, and subsequent stages STAGE[4], STAGE[5], STAGE[6], . . . may receive a gate signal GS[1], GS[2], GS[3], GS[4], GS[5], GS[6], . . . of each previous stage. Additionally, the method of applying the first to sixth clock signals CLK1 to CLK6 may be repeated in units of six stages.

In an embodiment, N may be 3 and J may be 1. In this case, the length of the activation period of each of the first to 2N-th clock signals CLK1 to CLK2N may be 1 horizontal time 1H, and the length of the deactivation period of each of the first to 2N-th clock signals may be 5 horizontal times 5H. Thus, a period of each of the first to 2N-th clock signals CLK1 to CLK2N may be 6 horizontal times 6H.

6 horizontal times 6H is relatively long. Therefore, the frequency of each of the first to sixth clock signals CLK1 to CLK6 may be low, resulting in small power consumption. Since the first to sixth clock lines CL1 to CL6 providing the first to sixth clock signals CLK1 to CLK6 are connected to one-third of the stages, the capacitance of the equivalent capacitor viewed from the first to sixth clock lines CL1 to CL6 is small, further reducing power consumption.

Figure 5:
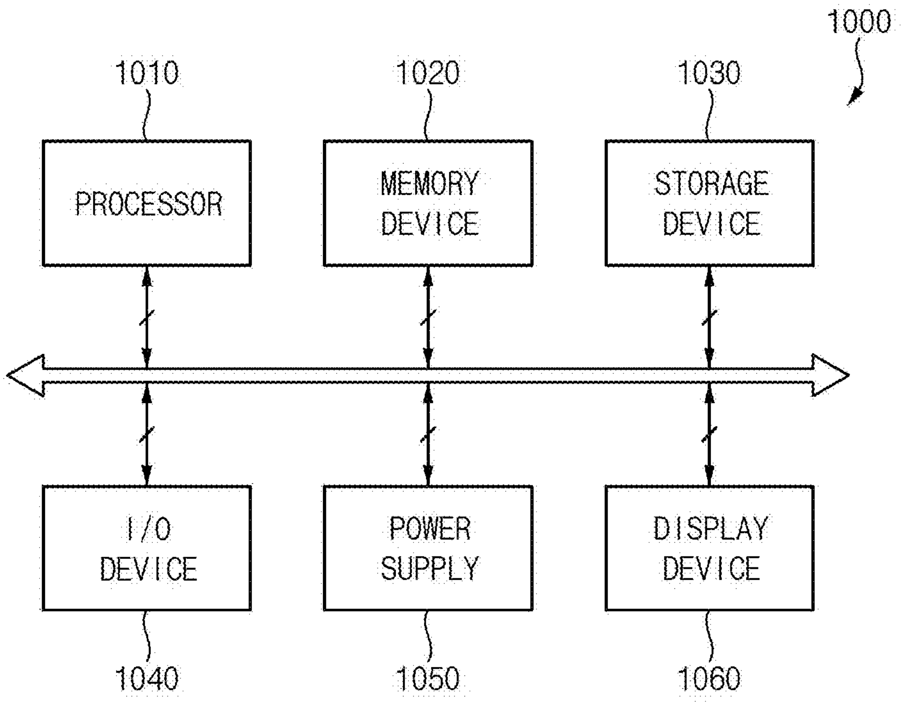
FIG. 5 is a block diagram illustrating an electronic device.
Figure 6:
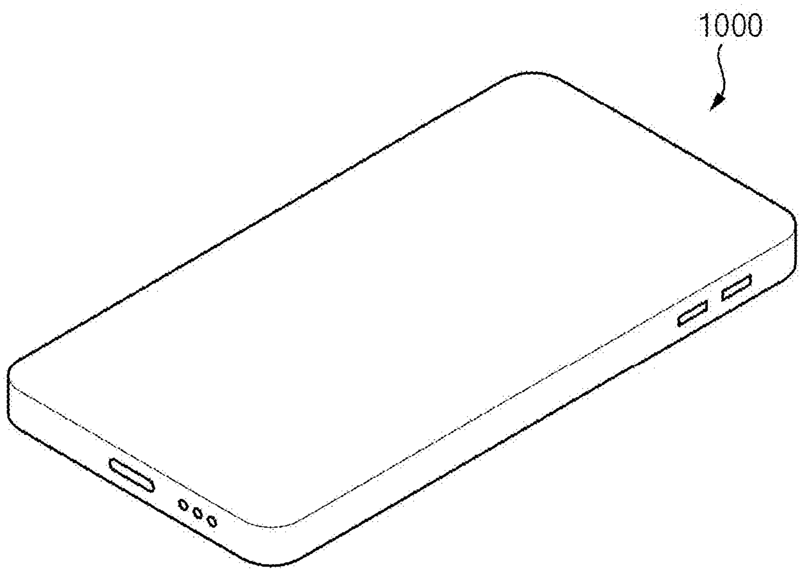
FIG. 6 is a diagram illustrating an embodiment in which the electronic device of FIG. 5 is implemented as a smart phone.

FIG. 5 is a block diagram illustrating an electronic device. FIG. 6 is a diagram illustrating an embodiment in which the electronic device of FIG. 5 is implemented as a smart phone.

Referring to FIGS. 5 and 6, the electronic device 1000 may include a processor 1010, a memory device 1020, a storage device 1030, an input/output (I/O) device 1040, a power supply 1050, and a display device 1060. The display device 1060 may be the display device 10 of FIG. 1. In addition, the electronic device 1000 may further include a plurality of ports for communicating with a video card, a sound card, a memory card, a universal serial bus (USB) device, another electronic device, and the like.

In an embodiment, as illustrated in FIG. 5, the electronic device 1000 may be implemented as the smart watch. However, the electronic device 1000 is not limited thereto. For example, the electronic device 1000 may be implemented as a cellular phone, a video phone, a smart pad, a smart watch, a tablet PC, a car navigation system, a computer monitor, a laptop, a head mounted display (HMD) device, and the like.

The processor 1010 may perform various computing functions. The processor 1010 may be a micro processor, a central processing unit (CPU), an application processor (AP), and the like. The processor 1010 may be coupled to other components via an address bus, a control bus, a data bus, and the like. Further, the processor 1010 may be coupled to an extended bus such as a peripheral component interconnection (PCI) bus.

The memory device 1020 may store data for operations of the electronic device 1000. For example, the memory device 1020 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, and the like and/or at least one volatile memory device such as a dynamic random access memory (DRAM) device, a static random access memory (SRAM) device, a mobile DRAM device, and the like.

The storage device 1030 may include a solid state drive (SSD) device, a hard disk drive (HDD) device, a CD-ROM device, and the like.

The I/O device 1040 may include an input device such as a keyboard, a keypad, a mouse device, a touch-pad, a touch-screen, and the like, and an output device such as a printer, a speaker, and the like. In some embodiments, the I/O device 1040 may include the display device 1060.

The power supply 1050 may provide power for operations of the electronic device 1000.

The display device 1060 may be connected to other components through buses or other communication links.

The inventive concepts disclosed herein may be applied to any display device and any electronic device including a touch panel. For example, the inventive concepts may be applied to a mobile phone, a smart phone, a tablet computer, a digital television (TV), a 3D TV, a personal computer (PC), a home appliance, a laptop computer, a personal digital assistant (PDA), a portable multimedia player (PMP), a digital camera, a music player, a portable game console, a navigation device, etc.

The foregoing is illustrative of the inventive concept and should not be construed as limiting thereof. Although a few embodiments have been described, those skilled in the art will readily appreciate that many modifications are possible without materially departing from the scope of the inventive concept. Accordingly, all such modifications are intended to be included within the scope of the inventive concept as set forth in the claims.

What is claimed is:

1. A gate driver comprising:

first to N-th stages (where N is a positive integer of 3 or more) for receiving first to N-th clock signals from first to N-th clock lines, wherein the first stage includes a first clock terminal for receiving the first clock signal, a second clock terminal for receiving a second clock signal, a carry terminal for receiving a vertical start signal, and an output terminal for outputting a first gate signal, wherein an N−K-th stage (where K is a positive integer between 1 and N−2) includes a first clock terminal for receiving an N−K-th clock signal, a second clock terminal for receiving an N−K+1-th clock signal, a carry terminal for receiving an N−K−1-th gate signal, and an output terminal for outputting an N−K-th gate signal, wherein the N-th stage includes a first clock terminal for receiving the N-th clock signal, a second clock terminal for receiving the first clock signal, a carry terminal for receiving an N−1-th gate signal, and an output terminal for outputting an N-th gate signal, wherein the first stage further includes:

a first transistor including a gate electrode for receiving the first clock signal, a first electrode for receiving the vertical start signal, and a second electrode connected to a first control node;

a second transistor including a gate electrode connected to an inverting control node, a first electrode for receiving a high gate voltage, and a second electrode;

a third transistor including a gate electrode for receiving the second clock signal, a first electrode connected to the second electrode of the second transistor, and a second electrode connected to the first control node;

a fourth transistor including a gate electrode connected to the first control node, a first electrode for receiving the first clock signal, and a second electrode connected to the inverting control node;

a fifth transistor including a gate electrode for receiving the first clock signal, a first electrode for receiving a low gate voltage, and a second electrode connected to the inverting control node;

a sixth transistor including a gate electrode connected to the inverting control node, a first electrode for receiving the high gate voltage, and a second electrode connected to a gate output node configured to output the first gate signal;

a seventh transistor including a gate electrode connected to a second control node, a first electrode for receiving the second clock signal, and a second electrode connected to the gate output node;

a first capacitor including a first electrode for receiving the high gate voltage and a second electrode connected to the inverting control node; and a second capacitor including a first electrode connected to the second control node and a second electrode connected to the gate output node, and wherein an activation period of each of the first to N-th clock signals does not overlap with each other.

2. The gate driver of claim 1, wherein, when N is 4, the gate driver comprises:

the first stage;

a second stage including a first clock terminal for receiving the second clock signal, a second clock terminal for receiving a third clock signal, a carry terminal for receiving the first gate signal, and an output terminal for outputting a second gate signal;

a third stage including a first clock terminal for receiving the third clock signal, a second clock terminal for receiving a fourth clock signal, a carry terminal for receiving the second gate signal, and an output terminal for outputting a third gate signal; and a fourth stage including a first clock terminal for receiving the fourth clock signal, a second clock terminal for receiving the first clock signal, a carry terminal for receiving the third gate signal, and an output terminal for outputting a fourth gate signal.

3. The gate driver of claim 1, when N is 6, the gate driver comprises:

the first stage;

a second stage including a first clock terminal for receiving the second clock signal, a second clock terminal for receiving a third clock signal, a carry terminal for receiving the first gate signal, and an output terminal for outputting a second gate signal;

a third stage including a first clock terminal for receiving the third clock signal, a second clock terminal for receiving a fourth clock signal, a carry terminal for receiving the second gate signal, and an output terminal for outputting a third gate signal;

a fourth stage including a first clock terminal for receiving the fourth clock signal, a second clock terminal for receiving a fifth clock signal, a carry terminal for receiving the third gate signal, and an output terminal for outputting a fourth gate signal;

a fifth stage including a first clock terminal for receiving the fifth clock signal, a second clock terminal for receiving a sixth clock signal, a carry terminal for receiving the fourth gate signal, and an output terminal for outputting a fifth gate signal; and a sixth stage including a first clock terminal for receiving the sixth clock signal, a second clock terminal for receiving the first clock signal, a carry terminal for receiving the fifth gate signal, and an output terminal for outputting a sixth gate signal.

4. The gate driver of claim 1, wherein, when a length of the activation period of each of the first to N-th clock signals is J horizontal time (where J is a positive number), a length of a deactivation period of each of the first to N-th clock signals is (N−1)×J horizontal time and a period of each of the first to N-th clock signals is N×J horizontal time.

5. The gate driver of claim 4, wherein, when N is 4 and J is 1, the length of the activation period of each of the first to N-th clock signals is 1 horizontal time and the length of the deactivation period of each of the first to N-th clock signals is 3 horizontal times, and a period of each of the first to N-th clock signals is 4 horizontal times.

6. The gate driver of claim 4, wherein, when N increases, the period of each of the first to N-th clock signals increases.

7. The gate driver of claim 4, wherein, when N increases, a capacitance of an equivalent capacitor viewed from each of the first to N-th clock lines decreases.

8. The gate driver of claim 1, the first stage further includes:

an eighth transistor including a gate terminal for receiving the low gate voltage, a first electrode connected to the first control node, and a second electrode connected to the second control node.

9. A display device comprising:

a display panel including pixels; and a gate driver configured to provide gate signals to the display panel, wherein the gate driver includes first to N-th stages (where N is a positive integer of 3 or more) for receiving first to N-th clock signals from first to N-th clock lines, wherein the first stage includes a first clock terminal for receiving the first clock signal, a second clock terminal for receiving a second clock signal, a carry terminal for receiving a vertical start signal, and an output terminal for outputting a first gate signal, wherein an N−K-th stage (where K is a positive integer between 1 and N−2) includes a first clock terminal for receiving an N−K-th clock signal, a second clock terminal for receiving an N−K+1-th clock signal, a carry terminal for receiving an N−K−1-th gate signal, and an output terminal for outputting an N−K-th gate signal, wherein the N-th stage includes a first clock terminal for receiving the N-th clock signal, a second clock terminal for receiving the first clock signal, a carry terminal for receiving an N−1-th gate signal, and an output terminal for outputting an N-th gate signal, wherein the first stage further includes:

- a first transistor including a gate electrode for receiving the first clock signal, a first electrode for receiving the vertical start signal, and a second electrode connected to a first control node;
- a second transistor including a gate electrode connected to an inverting control node, a first electrode for receiving a high gate voltage, and a second electrode;
- a third transistor including a gate electrode for receiving the second clock signal, a first electrode connected to the second electrode of the second transistor, and a second electrode connected to the first control node;
- a fourth transistor including a gate electrode connected to the first control node, a first electrode for receiving the first clock signal, and a second electrode connected to the inverting control node;
- a fifth transistor including a gate electrode for receiving the first clock signal, a first electrode for receiving a low gate voltage, and a second electrode connected to the inverting control node;
- a sixth transistor including a gate electrode connected to the inverting control node, a first electrode for receiving the high gate voltage, and a second electrode connected to a gate output node configured to output the first gate signal;
- a seventh transistor including a gate electrode connected to a second control node, a first electrode for receiving the second clock signal, and a second electrode connected to the gate output node;
- a first capacitor including a first electrode for receiving the high gate voltage and a second electrode connected to the inverting control node; and
- a second capacitor including a first electrode connected to the second control node and a second electrode connected to the gate output node, and wherein an activation period of each of the first to N-th clock signals does not overlap with each other.

10. The display device of claim 9, wherein, when N is 4, the gate driver comprises:

the first stage including the first clock terminal for receiving the first clock signal, a second clock terminal for receiving the second clock signal, the carry terminal for receiving the vertical start signal, and the output terminal for outputting the first gate signal;

a second stage including a first clock terminal for receiving the second clock signal, a second clock terminal for receiving a third clock signal, a carry terminal for receiving the first gate signal, and an output terminal for outputting a second gate signal;

a third stage including a first clock terminal for receiving the third clock signal, a second clock terminal for receiving a fourth clock signal, a carry terminal for receiving the second gate signal, and an output terminal for outputting a third gate signal; and a fourth stage including a first clock terminal for receiving the fourth clock signal, a second clock terminal for receiving the first clock signal, a carry terminal for receiving the third gate signal, and an output terminal for outputting a fourth gate signal.

11. An electronic device comprising:

a display device comprising:

a display panel including pixels; and a gate driver configured to provide gate signals to the display panel, wherein the gate driver includes first to N-th stages (where N is a positive integer of 3 or more) for receiving first to N-th clock signals from first to N-th clock lines, wherein the first stage includes a first clock terminal for receiving the first clock signal, a second clock terminal for receiving a second clock signal, a carry terminal for receiving a vertical start signal, and an output terminal for outputting a first gate signal, wherein an N−K-th stage (where K is a positive integer between 1 and N−2) includes a first clock terminal for receiving an N−K-th clock signal, a second clock terminal for receiving an N−K+1-th clock signal, a carry terminal for receiving an N−K−1-th gate signal, and an output terminal for outputting an N−K-th gate signal, wherein the N-th stage includes a first clock terminal for receiving the N-th clock signal, a second clock terminal for receiving the first clock signal, a carry terminal for receiving an N−1-th gate signal, and an output terminal for outputting an N-th gate signal, wherein the first stage includes:

- a first transistor including a gate electrode for receiving the first clock signal, a first electrode for receiving the vertical start signal, and a second electrode connected to a first control node;
- a second transistor including a gate electrode connected to an inverting control node, a first electrode for receiving a high gate voltage, and a second electrode;
- a third transistor including a gate electrode for receiving the second clock signal, a first electrode connected to the second electrode of the second transistor, and a second electrode connected to the first control node;
- a fourth transistor including a gate electrode connected to the first control node, a first electrode for receiving the first clock signal, and a second electrode connected to the inverting control node;
- a fifth transistor including a gate electrode for receiving the first clock signal, a first electrode for receiving a low gate voltage, and a second electrode connected to the inverting control node;

a sixth transistor including a gate electrode connected to the inverting control node, a first electrode for receiving the high gate voltage, and a second electrode connected to a gate output node configured to output the first gate signal;

a seventh transistor including a gate electrode connected to a second control node, a first electrode for receiving the second clock signal, and a second electrode connected to the gate output node;

a first capacitor including a first electrode for receiving the high gate voltage and a second electrode connected to the inverting control node; and a second capacitor including a first electrode connected to the second control node and a second electrode connected to the gate output node, and wherein an activation period of each of the first to N-th clock signals does not overlap with each other.

12. The electronic device of claim 11, wherein the first stage further includes:

an eighth transistor including a gate terminal for receiving the low gate voltage, a first electrode connected to the first control node, and a second electrode connected to the second control node.

* * * * *